US012012028B2

(12) United States Patent
Bonerb

(10) Patent No.: US 12,012,028 B2
(45) Date of Patent: Jun. 18, 2024

(54) ULTRA-LIGHTWEIGHT, PORTABLE, AND EXTREMELY LOW PRESSURE DUMP SYSTEM FOR HANDLING DRY OR WET MATERIALS

(71) Applicant: Timothy C. Bonerb, Rye Beach, NH (US)

(72) Inventor: Timothy C. Bonerb, Rye Beach, NH (US)

( * ) Notice: Subject to any disclaimer, the term of this patent is extended or adjusted under 35 U.S.C. 154(b) by 72 days.

(21) Appl. No.: 18/173,708

(22) Filed: Feb. 23, 2023

(65) Prior Publication Data

US 2023/0278480 A1 Sep. 7, 2023

Related U.S. Application Data

(60) Provisional application No. 63/473,779, filed on Jun. 27, 2022, provisional application No. 63/372,355, filed on Mar. 7, 2022.

(51) Int. Cl.
*B60P 1/22* (2006.01)
*B60P 1/16* (2006.01)

(52) U.S. Cl.
CPC ............. *B60P 1/22* (2013.01); *B60P 1/165* (2013.01)

(58) Field of Classification Search
CPC .................................. B60P 1/22; B60P 1/165
USPC ........................................................ 298/22 R
See application file for complete search history.

(56) References Cited

U.S. PATENT DOCUMENTS

| 3,659,899 | A | * | 5/1972 | Phillips | ..................... B60P 1/16 298/1 A |
| 3,711,157 | A | | 1/1973 | Smock | |
| 3,752,502 | A | * | 8/1973 | Ehler | ................... B62D 53/067 280/440 |
| 3,784,255 | A | * | 1/1974 | Smock | .................... B60P 1/165 92/92 |
| 3,994,474 | A | * | 11/1976 | Finkbeiner | .............. B66F 7/085 254/93 HP |

(Continued)

FOREIGN PATENT DOCUMENTS

| AU | 9056077 | A | * | 12/1990 | ................ B60P 1/16 |
| GB | 2168323 | A | * | 6/1986 | ................ B60P 1/02 |

(Continued)

OTHER PUBLICATIONS

B Wise Trailers, "B Wise Trailers Owners Manual for Legacy Bri-Mar D1 100 Dump Insert", May 2021.

(Continued)

*Primary Examiner* — Hilary L Gutman

(57) ABSTRACT

A dump system (e.g., for setting in a vehicle's flatbed or trailer) includes a base, a container (for containing material) configured to pivot relative to the base, an inflate membrane coupled to the base and to the container, and a U-frame that extends around the inflate membrane and is configured to pivot relative to the base. The U-frame is configured to restrain outward expansion of the inflate membrane as the inflate membrane expands pushing on the container and causing the container to pivot upward. Some implementations include, in addition to or instead of the U-frame, a wing frame panel configured to collect and contain folds that form from material of the inflate membrane as the inflate membrane deflates and collapses (or when the inflate membrane is in a collapsed or deflated state).

34 Claims, 15 Drawing Sheets

(56) References Cited

U.S. PATENT DOCUMENTS

| | | | |
|---|---|---|---|
| 5,067,774 A | 11/1991 | Trowland | |
| 5,560,684 A | 10/1996 | Gilmore | |
| 5,975,643 A | 11/1999 | Smith et al. | |
| 6,254,192 B1 | 7/2001 | Spreitzer | |
| 6,267,448 B1 | 7/2001 | Hendry et al. | |
| 6,711,774 B2 * | 3/2004 | Hodges | B65G 69/2823 |
| | | | 14/71.3 |
| 7,416,378 B1 | 8/2008 | Adams | |
| 8,123,433 B2 | 2/2012 | Mans | |
| 2008/0001130 A1 * | 1/2008 | Dibdin | B66F 7/08 |
| | | | 414/495 |

FOREIGN PATENT DOCUMENTS

| | | | |
|---|---|---|---|
| GB | 2206158 A * | 12/1988 | B66F 3/35 |
| WO | 01/40089 | 6/2001 | |
| WO | 2012089219 | 7/2012 | |

OTHER PUBLICATIONS

Buyers Products Company, 6 Foot Dumper Dog Steel Dump Insert Specification Sheet; Feb. 2021.

* cited by examiner

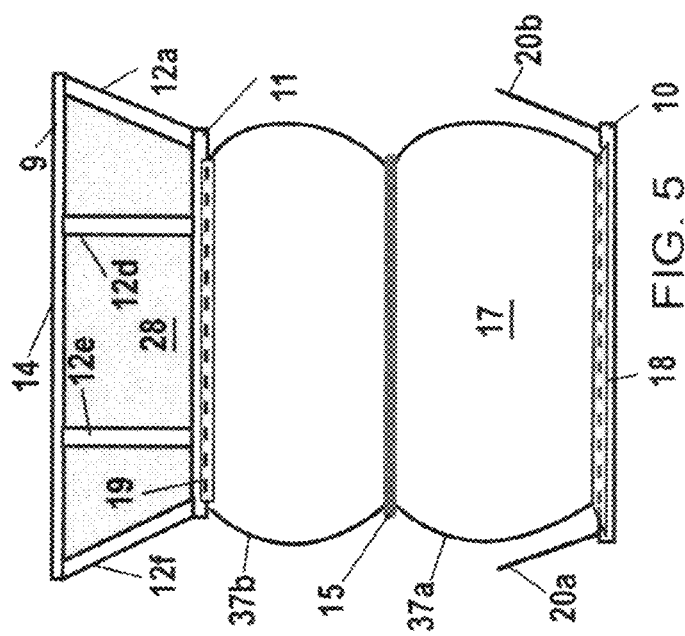
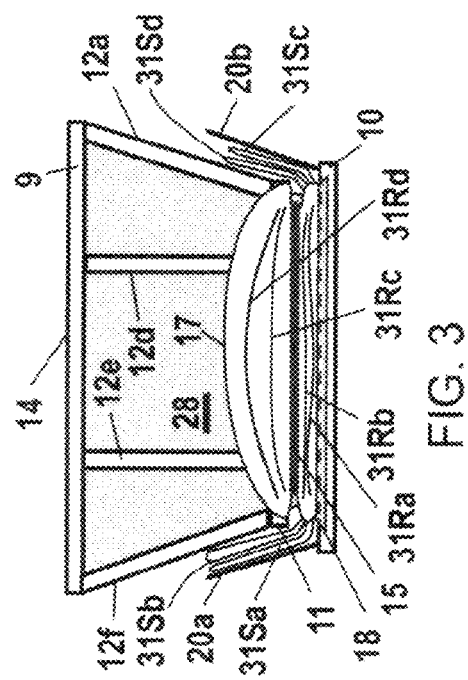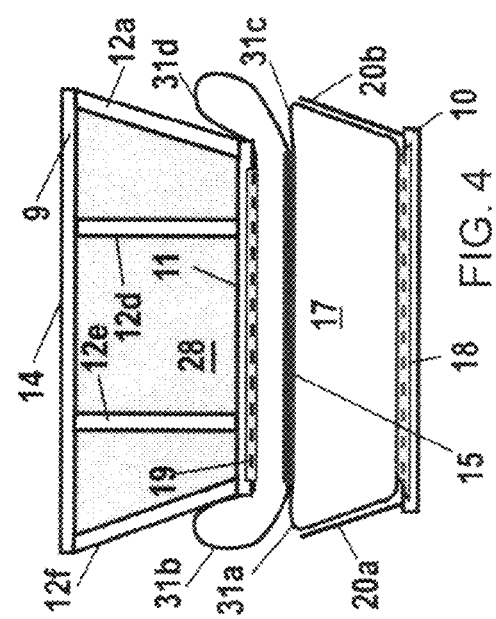

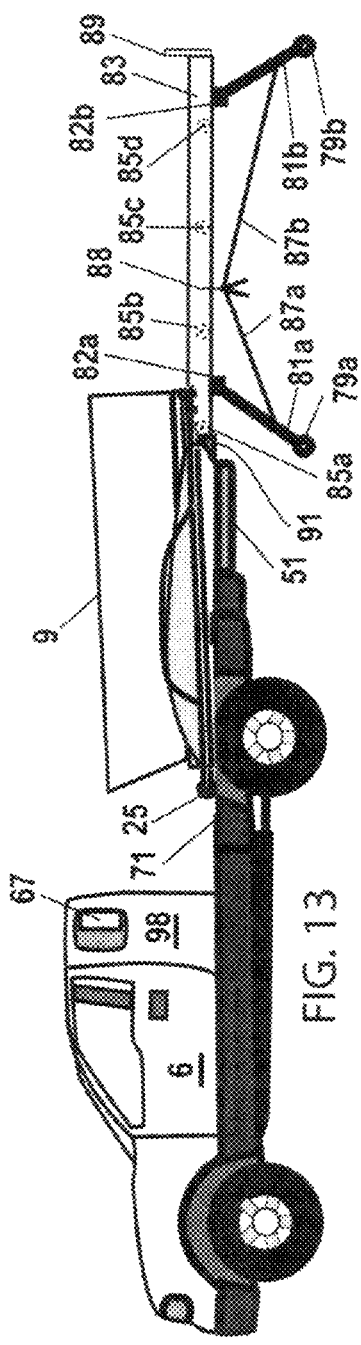
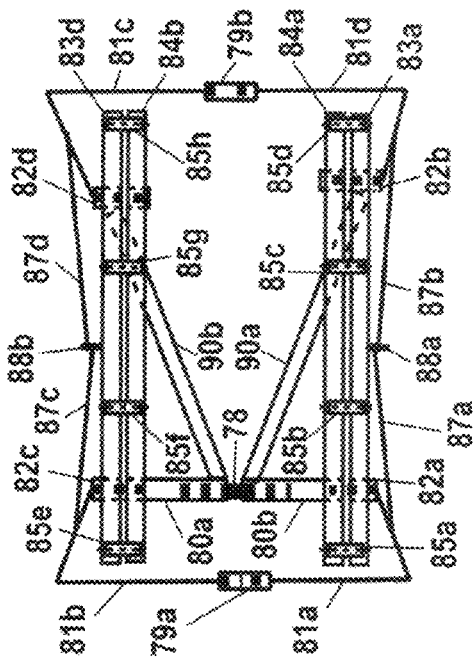
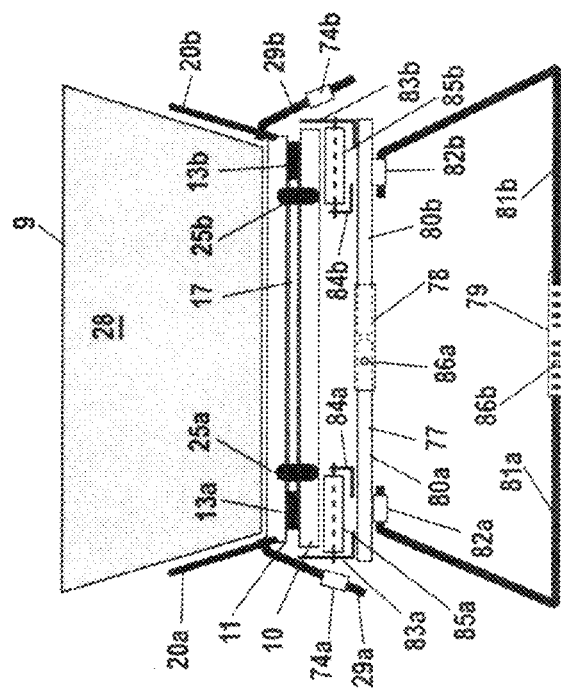
FIG. 13
FIG. 15
FIG. 14

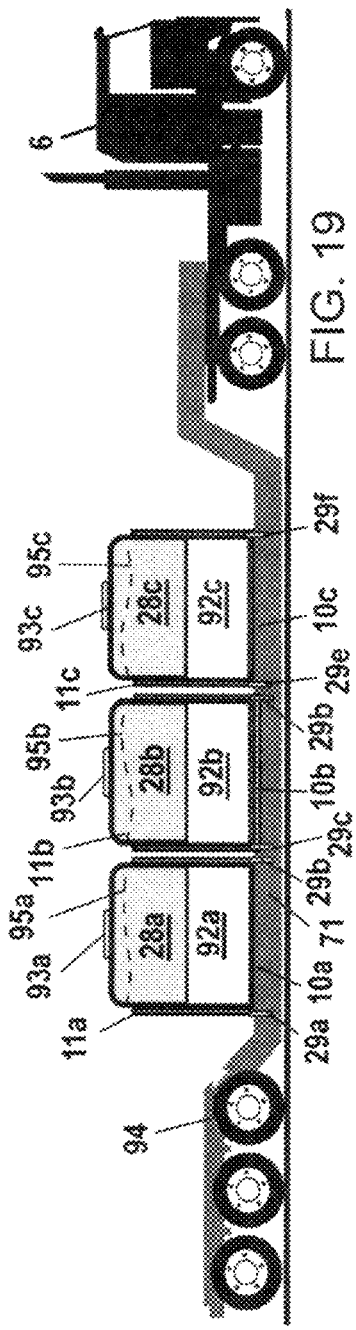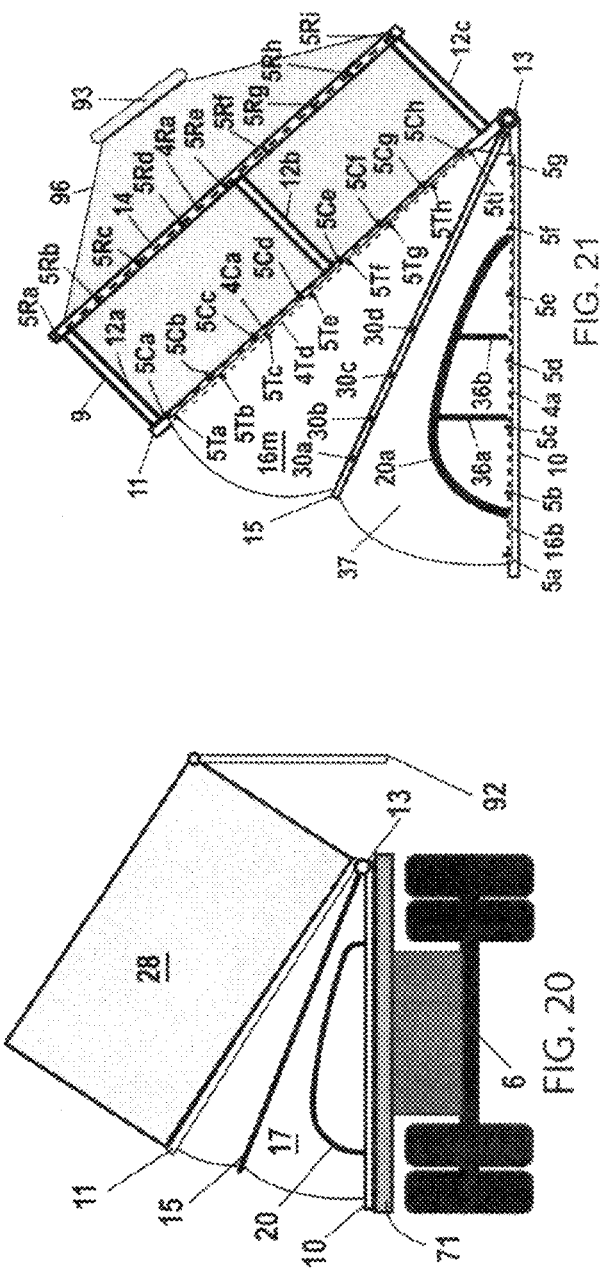

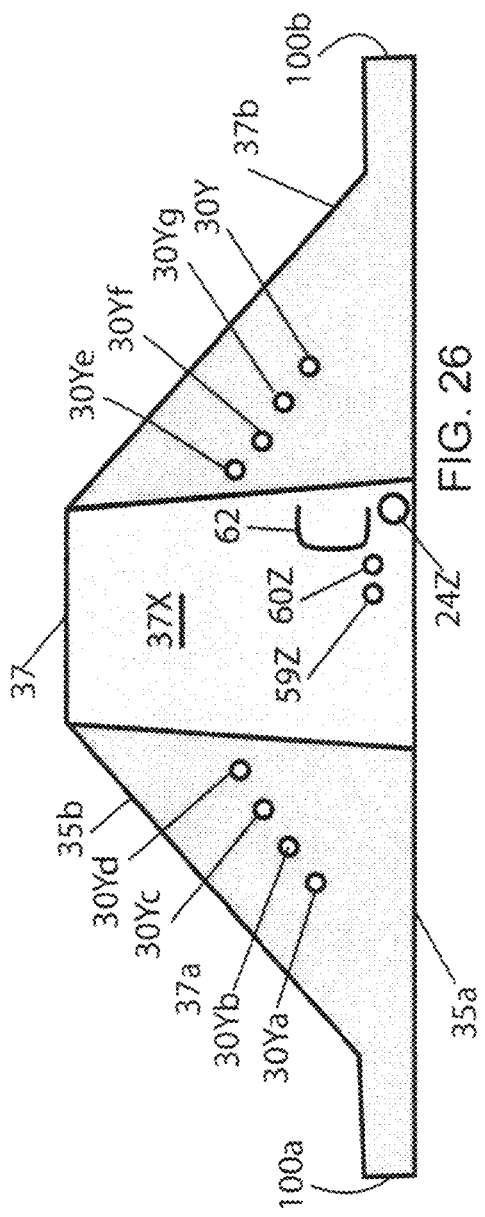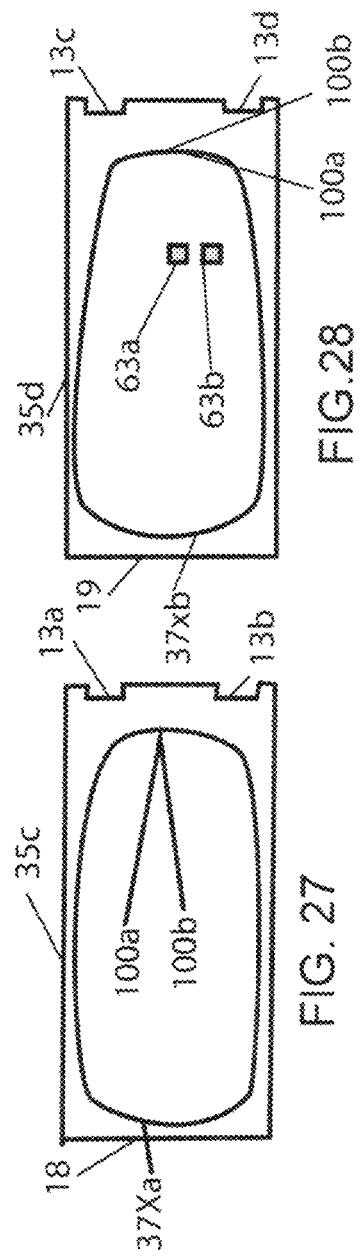

ULTRA-LIGHTWEIGHT, PORTABLE, AND EXTREMELY LOW PRESSURE DUMP SYSTEM FOR HANDLING DRY OR WET MATERIALS

CROSS-REFERENCE TO RELATED APPLICATION(S)

This application claims the benefit of U.S. Provisional Patent Application Ser. No. 63/372,355, filed Mar. 7, 2022, and entitled Method or Apparatus for Using One or More Inflatable Membranes as a Lifting Device for Lightweight, Portable Dump Equipment and U.S. Provisional Patent Application Ser. No. 63/473,779, filed Jun. 27, 2022, and entitled Improvements in the Method and Apparatus of Using a Low Pressure Inflatable Membrane as a Dumping and Lifting Device for Ultra-Lightweight and Portable Dump Equipment. The disclosures of the prior applications are incorporated by reference herein in their entirety.

FIELD OF INVENTION

This disclosure relates to a dump system, and more particularly, relates to an ultra-lightweight dump system for handling wet or dry materials.

BACKGROUND

Transporting dry materials, including landscaping materials, and the like on roads can be challenging. Portable dump systems can provide much needed additional load carrying capacity when needed. Dump systems, however, can be very heavy, and difficult and labor intensive to attach and detach. The use of a hydraulic pump and cylinder(s) for tilting a steel dump container, as used on standard dump trucks and dump trailers has been adapted for use on small pickup trucks as an insert. While this dump system configuration functions, it tends to be very heavy (e.g., 800 pounds or thereabouts and up), expensive, and requires a sophisticated hydraulic system with, often, a 1.5 hp motor. Because the unit is so heavy, it typically requires that a pickup truck be dedicated for its use because it requires a fork truck to install and/or remove from the bed of a truck. Also, with many pickup trucks having a payload capacity between 1,200 and 2,300 pounds, the 700 pounds of weight significantly reduces the actual payload a pickup truck can safely and efficiently transport which often causes the user to buy a bigger and less efficient truck.

SUMMARY OF THE INVENTION

In one aspect, a dump system (e.g., for setting in a vehicle's flatbed or trailer) includes a base, a container (for containing material) configured to pivot relative to the base, an inflate membrane coupled to the base and to the container, and a U-frame that extends around the inflate membrane and is configured to pivot relative to the base. The U-frame is configured to restrain outward expansion of the inflate membrane as the inflate membrane expands pushing on the container and causing the container to pivot upward. Some implementations include, in addition to or instead of the U-frame, a wing frame panel configured to collect and contain folds that form from material of the inflate membrane as the inflate membrane deflates and collapses (or when the inflate membrane is in a collapsed or deflated state).

In another aspect, a dump system includes a base, a container configured to pivot relative to the base, an inflate membrane coupled to the base and to the container, and a first wing frame panel adjacent to a first side surface of the inflate membrane. The first wing frame panel is configured to collect and contain folds that form from material of the inflate membrane as the inflate membrane deflates and collapses. In some implementations, the dump system further includes a second wing frame panel adjacent to a second side surface of the inflate membrane. The second side surface of the inflate membrane is opposite the first side surface of the inflate membrane. Moreover, in some implementations, one or more U-frames extend around the inflate membrane and are configured to pivot upward relative to the base as the inflate membrane expands and to pivot downward relative the base as the inflate membrane collapses. Each U-frame is configured to restrain outward expansion of the inflate membrane as the inflate membrane expands pushing on the container and causing the container to pivot upward. The U-frame may include one or more U-frame interior supports that extend through an opening in the inflate membrane.

In yet another aspect, a method includes: providing a dump system configured to fit onto a vehicle's flatbed or trailer to provide dumping capabilities to the vehicle's flatbed or trailer, providing a storage rack for the dump system, providing a vehicle with a flat bed or trailer configured to receive the dump system, positioning the dump system onto the vehicle's flatbed or trailer or onto the storage rack, positioning a rear end of the vehicle's flatbed or trailer adjacent to a loading end of the storage rack, and transferring the dump system between the vehicle's flat bed or trailer and the storage rack in such a manner that the dump system remains in direct physical contact with the vehicle's flat bed or trailer, the storage rack, or both the vehicle's flat bed or trailer and the storage rack. In a typical implementation, during an entirety of the transfer, the dump system remains in direct physical contact with an upper surface of the vehicle's flat bed or trailer, one or more of the rollers of the storage rack, or both.

In still another aspect, a storage rack for storing a dump system is disclosed. The storage rack has rack legs, a rack frame atop and supported by the rack legs, and a pair of roller frame assemblies atop and supported by the rack frame. The roller frame assemblies extend lengthwise along the storage rack parallel to one another and laterally separated from one another so that a first one of the roller frame assemblies is on a right side of the storage rack while a second one of the roller frame assemblies is on a left side of the storage rack. Rollers are supported by each of the roller frame assemblies. Each of the roller frame assembly has an exterior frame and an interior frame. The exterior frame may be higher than the rollers and the interior frame may be lower than rollers (e.g., to guide an object rolling along the rollers). The roller frame assemblies support the rollers. Each of the rollers is parallel to all other rollers supported by the same one of the roller frame assemblies. The storage rack, in some implementations, also has a stop at an end of the storage rack opposite a loading end of the storage rack. The stop may be a rigid panel that extends upwardly to provide a barrier for any object being rolled across the rollers of the storage rack.

In some implementations, one or more of the following advantages are present.

First, implementations of the dump system disclosed herein may enjoy performance characteristics that are surprisingly robust, particularly given the relatively low cost, low operating pressures, and high loads that the dump system can handle and quickly and effectively dump. In an exemplary implementation, the dump system utilizes a very low pressure blower (of the type normally found on a vacuum cleaner) to inflate the inflate membrane in a manner that produces lifting/dumping capacity that is able to lift/dump a large load (e.g., of 2,000 pounds or more) in a container atop the inflate membrane, quickly (e.g., within two or three minutes). The very low pressure blower tends to be very low cost (e.g., about $100) and light weight (e.g., about 5 pounds+/−10%). Moreover, the very low pressure blower may, in some instances, be operable to produce flow of about 100 cubic feet per minute (+/−10%) at less than ½ pounds per square inch (psi). The inflate membrane used in this system typically is large and typically spans across and presses up against a large percentage of the upper surface of the inflate membrane (which may form or be in contact with or apply force to the bottom of the container) to pivot the container up when the inflate membrane inflates. Since the very low pressure (e.g., less than ½ psi) is spread out across the large inflate membrane and across the large interface the cumulative force applied to urge the container upward is sufficient to provide satisfactory and excellent performance.

In an exemplary implementation, these surprising performance characteristics may be realized utilizing a large (e.g., 185 square feet or more) inflate membrane with a low cost blower configured to produce air flow into the inflate membrane of at least 100 cubic feet per minute (cfm) with a pressure of less than ½ pound per square inch (psi). In an exemplary implementation, these surprising performance characteristics may be realized utilizing a large (e.g., 185 square feet or more) inflate membrane with a low cost blower configured to produce air flow into the inflate membrane of at least 100 cfm (+/−20%) with a pressure of less than 1 psi, less than 2 psi, less than 3 psi, or less than 4 psi.

Additionally, for example, some implementations define a low cost, portable, light weight, self-contained dump system that can be inserted and/or easily installed, removed, and/or reinstalled in a vehicle's flat bed or trailer to provide dumping capabilities. The dump system is strong and durable. Moreover, the dumping angle that can be achieved in a typical implementation is very high making the actual dumping of material out of the dump system's container very reliable with little effort. Because of the low weight of the dump system, the weight carrying capacity of the vehicle with the dump system remains high. Moreover, lower power and lower cost vehicles can perform at very high levels of performance.

Moreover, in some implementations, unlike other dump equipment, implementations of the dump system disclosed herein does not have a rigid floor, it is fabric. Some implementations, however, do have an added rigid floor if desired.

Other features and advantages will be apparent from the description and drawings, and from the claims.

BRIEF DESCRIPTION OF THE DRAWINGS

FIG. 3 is an end view of the dump system with inflate membrane completely deflated.

FIG. 4 is an end view of the dump system as inflate membrane is inflated.

FIG. 5 is an end view of the dump system as inflate membrane is further inflated and as dump frame extends upward.

FIG. 13 is a view of how the storage rack may interface with a truck.

FIG. 14 is a front view of the storage rack with dump system thereupon.

FIG. 15 is a top view of storage rack.

FIG. 19 is a side view of truck with dump system containers secured to the trailer.

FIG. 20 is an end view of the dump system installed on the cargo bed of the trailer.

FIG. 21 is a side view of the dump system with inflate membrane partially inflated.

FIG. 26 is a layout of fabric, for example, to form sidewalls of an exemplary inflate membrane.

FIG. 27 is a layout of fabric, for example, to form an exemplary bottom panel of inflate membrane.

FIG. 28 is a layout of fabric, for example, to form an exemplary top panel of inflate membrane.

Like reference numerals refers to similar elements.

DETAILED DESCRIPTION

This disclosure relates to a dump system, and more particularly, relates to an ultra-lightweight dump system for handling wet or dry materials.

Figure 1:
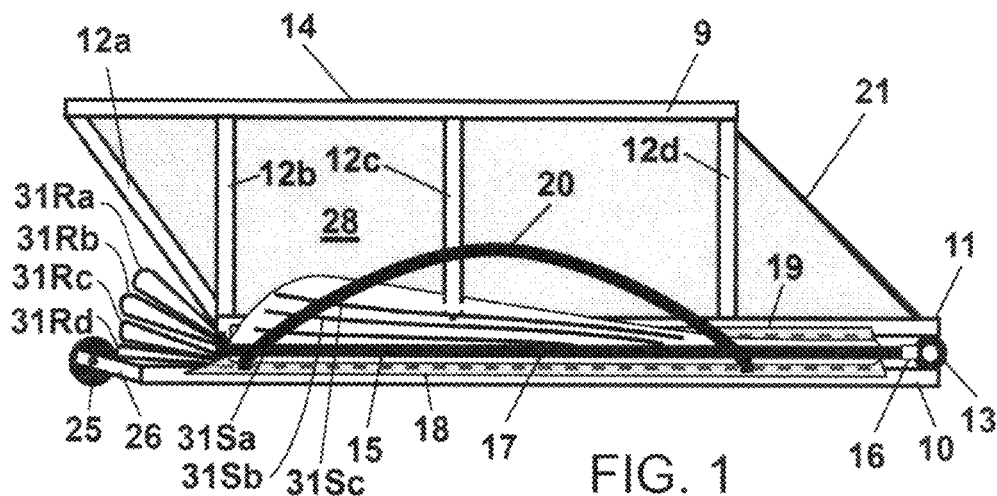
FIG. 1 is a side view of a dump system with a deflated inflate membrane.
Figure 2:
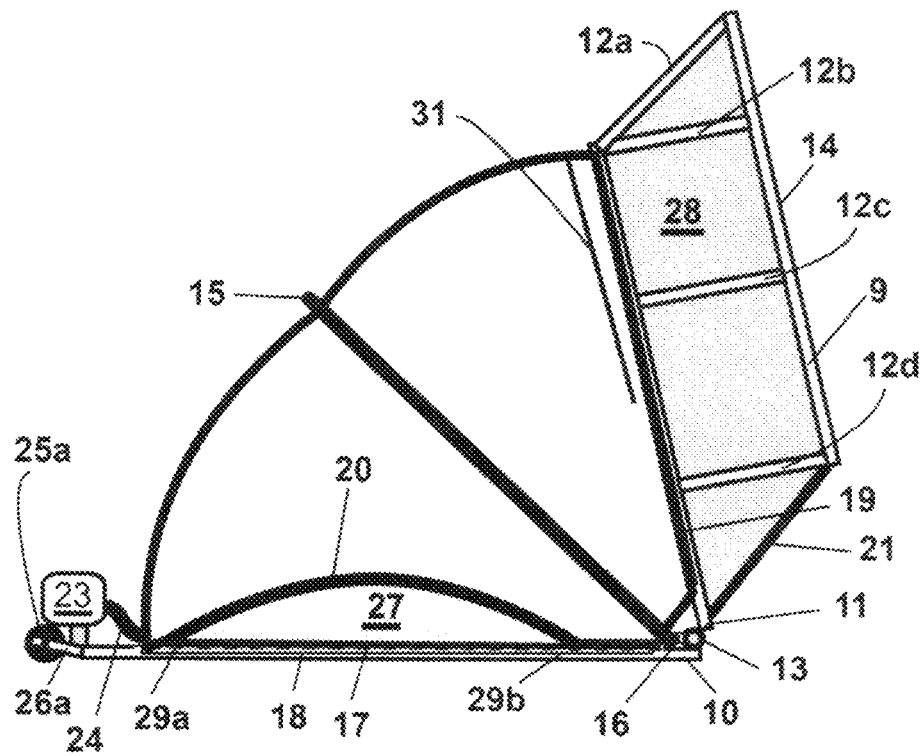
FIG. 2 is a side view the dump system showing an elevated dump frame as inflate membrane is inflated.

FIGS. 1 and 2 are side views showing an implementation of a dump system 9 that is configured to be placed into a vehicle (e.g., on a flatbed or trailer) to provide the vehicle with dumping capabilities. FIG. 1 shows the dump system 9 in a lowered configuration (suitable for holding and/or transporting material), while FIG. 2 shows the dump system 9 in a raised configuration (suitable for depositing or dumping material out of the dump system).

Some of the main components of the illustrated dump system 9 include a base frame 10, a dump frame 11 coupled to the base frame via a hinge 13, a container 28 (for carrying material) coupled to and supported by the dump frame 11, an inflate membrane 17 between the base frame 10 and the dump frame 11, a blower (not shown in FIG. 1 but see 23 in FIG. 2) to inflate the inflate membrane 17, a U-frame that extends from a frame hinge 16 around a portion of the inflate membrane 17 to control a shape of the inflate membrane 17 when inflated, and wing frames 20 on opposite sides of the container 28 to help contain and control the inflate membrane when collapsed. The frame hinge 16 is physically close to hinge 13. Both the frame hinge 16 and hinge 13 are at or near (e.g., within 6 inches of) the front end of the dump system 9 in the illustrated implementation. (See FIG. 1). Moreover, in the illustrated implementation, both the frame hinge 16 and hinge 13 are in the same plane. Thus, both the container 28 (which pivots about hinge 13) and the U-frame 15 (which pivots about frame hinge 16) pivot in the same manner—with their rear ends swinging upwardly and their front ends remaining low.

As suggested above and apparent from the illustrated figures, the dump system 9 is generally operable to move the container 28 between a lowered position (shown in FIG. 1) and a raised position (shown in FIG. 2). The lowered position is convenient for loading material into the container 28 and for transporting the loaded container 28 from one location to another (e.g., on the back of a transport vehicle when the dump system 9 is placed onto the vehicle's flatbed). The raised position is a dumping position and convenient for dumping or depositing loaded material out of the container (e.g., at a desired dumping location). In a typical implementation, the illustrated dump system 9 moves the container 28 from a lowered position (e.g., as in FIG. 1) to a raised position (e.g., as in FIG. 2) by inflating an inflate membrane 17 that pushes the container 28 to the raised position when inflated with air. Additionally, in a typical implementation, the illustrated dump system 9 moves the container 28 by allowing air to escape from the inflate membrane 17 thereby deflating the inflate membrane 17, which allows the container to drop back (e.g., largely under the influence of gravity) to the lowered position.

Placing the dump system 9 in back of an ordinary vehicle (e.g., on a flatbed of a truck or on a trailer) essentially converts that ordinary vehicle into a vehicle that has dumping capabilities. With the dump system 9 positioned on the flatbed of a non-dump truck or trailer, an operator may, for example, load the container 28 with material at one location while the container 28 is in the lowered position (e.g., as in FIG. 1), drive the dump system 9 with the loaded container 28 to a desired destination, and dump the material out of the container 28 of the dump system 9 by raising the container 28 to the raised position (e.g., as in FIG. 2) at the desired destination. Typically, the material would flow out the back of the container 28 when in the raised position. Once emptied, the operator may lower the container 28 back to the lowered position and drive off with the container 28 sitting in the back of the vehicle in the lowered position ready to be loaded up again.

In some implementations, one or more of the following advantages are present.

For example, dump system implementations disclosed herein may improve handling, storing, transporting, and discharging various materials. Dump system implementations disclosed herein may provide a marked improvement in equipping trucks and/or trailers that have fixed beds with dump system functionalities. Dump system implementations disclosed herein may be ultra-lightweight and portable. This may include an extremely lightweight frame/base frame and dumping container and, collectively, may weigh 75% less than certain existing dump inserts in the market today. Also, as a result of the current dump inserts that function via a hydraulic cylinder and pump; and weigh between 750 to 900 pounds, the only significant difference between those current dump inserts is the height and shape of the dump containers' sidewalls. Because these dump inserts tend to be very heavy (e.g., having a tare weight of about 800 pounds or thereabouts), they usually require larger model pickup trucks (e.g., ¾-ton capacity pickup trucks, e.g., a Ford F-250, instead of a Ford F-150), which can be very costly (e.g., costing about an additional $7,000 over smaller trucks). Additionally, the heavier weights result in reduced fuel economy/mileage ratings (e.g., from about 22 mpg to about 16 mpg). In addition to the added $7,000 in cost and reduced fuel mileage rating (e.g., to about 16 mpg), industry experts estimate that for every 100 hundred pounds of extra weight a vehicle carries there is a 2% reduction in fuel efficiency. At 800 pounds of extra dead weight on board, that is a further reduction in fuel economy by 16% (potentially bringing mileage to just 13.5 mpg). To make matters worse, typically, these other dump inserts are usually permanently installed on a vehicle (and sold only through dealers that can handle the installation requirements, which results in further extra cost), which means that no matter where the truck is going to be driven, even if empty, the operator is required to buy a more expensive truck and suffer significantly greater costs for fuel. Other requirements of these dump inserts is that some of them can only be used on pickup trucks having only a two person cab (no back seats) and some must have the vehicle's tail gate removed. In various implementations, the dump system disclosed herein overcomes or addresses one or more (or all) of these shortcomings in current systems.

Another significant advantage, in certain implementations, is that the dump system (insert) is very low in weight (weighing approximately 200 pounds) making it easy and safe to install, remove, and/or reinstall quickly (e.g., by one person sometimes as fast as less than a minute). In some implementations, a portable and collapsible storage rack may be provided that can be used not only for storing the insert (e.g., at the truck's home base or some other location) but can also be moved from job site to job site and used like a dumpster. Even when filled with 1,000 or more pounds of cargo (e.g., grass clippings, refuse, mulch, old shingles, salt, and/or other bulk materials), the insert can be pushed back and forth between a vehicle and the storage rack easily. In some instances, the insert may be loaded with material while sitting on the storage rack and then the insert may be rolled (with ease) onto the vehicle for transport to another location and emptied (e.g., dumped) there.

Another feature in certain implementations is that the cargo in the dump body can be weighed (approximately + or −100 lbs.) via the amount of air pressure generated in the inflatable membrane during lifting. Typically, the air pressure required for the dump system to operate effectively is very low (e.g., less than 3 PSI, less than 2 PSI). This ultra-light and portable dump and storage system can be used in a variety of settings including, for example, on any flat surface including the ground, a cement floor as well as on the cargo beds of almost any vehicle such as pick-up trucks, vans, landscape and highway trailers, grain wagons, rail cars, ships, and planes.

One of the more vexing problems and challenges of using low pressures is the use of a large, generally cuboid-shaped inflatable membrane (e.g., with a typical surface area of approximately 185 square feet (+/−10%) compared to other dump systems' footprint (e.g., of only 32 square feet)). Of course, the size of the membrane can vary and the area of material (e.g., fabric) that defines the interior space for receiving air in the inflate membrane can be greater than 185 square feet, especially if the container being lifted/pivoted to dump is especially large. This results in a lot of membrane material to manage, especially when the inflate membrane deflates. Managing such a large amount of inflate membrane material (e.g., PVC coated fabric) may be solved, as described herein, by the use of a pivoting U-Frame and/or guide frames (e.g., wing frames) to not only handle the folds created in the inflate membrane side walls, for example, but to also control the folds so they function in a set and repeatable manner. Another significant advantage of using an extremely large inflate membrane combined with the use of a pivoting U-frame and/or guide frames (e.g., wing frames) is that the maximum dump angle of 45 degrees limitation that is typical in certain current dump inserts is easily surpassed. In some instances, a maximum dump angle of up to 90 degrees can be achieved. As many bulk handling experts and practitioners know, a maximum dump angle of 45 degrees may not steep enough to handle certain materials that are not free-flowing. Materials such as grass clippings, dirt, mulch, and other landscaping materials, especially when damp or wet, may require a dump angle of approximately 60 degrees to 80 degrees for efficient and/or quick and/or easy dumping, emptying, and complete clean out.

Other features and advantages will be apparent from the rest of the description, the drawings, and from the claims.

The base frame 10 can have any one of a variety of different configurations. In a typical implementation, the base frame 10 includes four rods arranged in a plane to define an outer, rectangular, perimeter of the base frame 10. The four rods include a front rod, a rear rod, and two side rods. The base frame 10 also may include several other rods that also lie in the plane and extend across an interior of the perimeter of the base frame 10 (e.g., from side rod to side rod), serving as cross-support members for the base frame 10. The cross-support member rods may be parallel to the front rod and the rear rod. Moreover, the front rod, the cross-support member rods, and the rear rod may be evenly spaced from one another in a front-to-back direction. The rods may be coupled to one another in any one of a variety of convenient ways including, for example, by welding or with the use of an adhesive between the rods. Each rod can have any one of a variety of different specific configurations including, for example, being configured as round or square steel tubing, slender bars, or other rigid material.

Likewise, the dump frame 11 can have any one of a variety of different configurations. In a typical implementation, the dump frame 11 includes four rods arranged in a first plane to define a rectangular bottom perimeter of the dump frame 11, four rods arranged in a second plane (parallel to the first plane) to define a rectangular top perimeter of the dump frame 11, and multiple rods that extend between the bottom perimeter rods and the top perimeters rods and support the top perimeter rods. In a typical implementation, the rectangular top perimeter is wider than, and offset in forward direction from, the rectangular bottom perimeter. The top perimeter rods essentially form a top rail 14 of the dump frame 11, and the multiple rods that extend between the bottom perimeter rods and the top perimeter rods act as dump frame posts 12a-12h. Again, the rods may be coupled to one another in any one of a variety of convenient ways including, for example, by welding or with the use of an adhesive between the rods. Moreover, each rod can have any one of a variety of different specific configurations including, for example, being configured as round steel tubing, slender bars, or other rigid material. A dump gate rail 21 extends from each of the frontmost dump posts (e.g., dump post 12d and the frontmost dump post on an opposite side of the dump system 9 from 12d) to a corresponding one of the front-to-back extending rods that form one of the sides of the bottom of the dump frame 11.

The inflate membrane 17 (e.g., an inflatable container or balloon) can have any one of a variety of different configurations. In a typical implementation, the inflate membrane 17 includes an inflate membrane bottom panel 18, an inflate membrane top panel 19, and a connecting panel that extends between the inflate membrane bottom panel 18 and the inflate membrane top panel 19 to define at least the side walls and rear wall of the inflate membrane. The inflate membrane bottom panel 18 is secured to the base frame 10 of the dump system 9 and extends between the rods that form the base frame 10. The inflate membrane top panel 19 is secured to the dump frame 11. More specifically, the inflate membrane top panel 19 is secured to and extends between the rods that form the bottom of the dump frame 11. The inflate membrane bottom panel 18 and the inflate membrane top panel 19 are configured such that, when the dump system 9 is in the lowered configuration (e.g., as in FIG. 1), the inflate membrane bottom panel 18 and the inflate membrane top panel 19 lie in planes that are parallel to one another. The inflate membrane connecting panel is coupled to both the inflate membrane bottom panel 18 and the inflate membrane top panel 19. The inflate membrane can be made from any one of a variety of materials that are able to be inflated and move between a first configuration such as the one shown in FIG. 1 (collapsed) to a second configuration such as the one shown in FIG. 2 (expanded).

The blower 23 is configured to blow air into the inflate membrane 17 to inflate the inflate membrane 17. Typically, the blower 23 is a low pressure blower. In some implementations, for example, the blower 23 has a capacity that can produce pressures up to, but not necessarily exceeding, 4 pounds per square inch (psi). The blower 23 in the illustrated implementation is configured to draw air from atmosphere (i.e., from the environment outside the dump system 9). In an exemplary implementation, the blower 23 has the capacity to deliver about 100 cubic feet per minute (CFM) into the inflate membrane 17 at about 3 psi. A variety of different blowers configurations may be suitable for use as the blower 23. One example utilizes Ametek Lamb #115923, which, in some implementations, may produce about 85 cfm at 15 inches WC.

The container 28 can have any one of a variety of different configurations. That said, typically, the container 28 is supported by the dump frame 11 and sits above the inflate membrane 17. Since the container 28 is supported by the dump frame 11, in a typical implementation, its size and shape is largely dictated by the physical configuration of rods that make up the dump frame 11. The container 28 has a bottom surface (that may be the inflate membrane top panel 19), side walls, and a rear wall. Typically, the container 28 is open at its top and front. Thus, in an example implementation, there is no container material (e.g., fabric) that extends between the rods that make up the top rails 14 of the dump frame 11. Similarly, in an example implementation, there is no container material (e.g., fabric) that extends between the rods that surround the front-facing side end of the dump frame 11. The container 28 can be made of any one of a variety of different materials. In an exemplary implementation, the container 28 is made of, or includes, a flexible material, such as 40 oz. PVC coated polyester fabric, woven polyester belting, or a rigid material like metal, fiberglass, wood, or plastic. Variations are, of course, possible.

The U-frame 15 is a physical structure configured to influence the shape and movement of the inflate membrane 17 as it inflates and deflates. More specifically, for example, as the inflate membrane inflates (see, e.g., FIG. 2), the frame 15 restrains outward expansion of a mid-section of the inflate membrane 17. This makes more of the force of the expanding inflate membrane 17 available for lifting the container 28. As shown in FIG. 2, when the inflate membrane 17 is inflated, the U-frame 15 wraps around and contains a middle portion of the inflate membrane 17 thereby restrains its outward expansion beyond the envelope defined by the U-frame 15. The U-frame 15 also may influence the shape and movement of the inflate membrane 17 as the inflate membrane 17 deflates and collapses. For example, in some instances, the U-frame 15 may act as sort of a coat hanger to influence where and how one or more folds in the inflate membrane material are created when the inflate membrane 17 deflates and collapses.

In a typical implementation, the U-frame 15 is a long, thin, rigid structure (e.g., lightweight tubing, rod, etc.) that is contoured to approximate the shape of a capital "U"—with two side portions and a curved rear portion that connects the two side portions. The two side portions of the U-frame 15 roughly correspond to the two side legs of capital "U" and the curved rear portion of the U-frame 15 roughly corresponds to the curved bottom section of capital "U." The forwardmost ends of the U-frame (i.e., the "tops" of the two side legs) are attached to one or more U-frame hinges (e.g., 16) that enable the U-frame 15 to pivot about a pivot point established by the U-frame hinge(s). With the dump system 9 in a lowered configuration (e.g., FIG. 1), each side portion of the U-frame 15 extends from its hinge connection point in a generally forward direction alongside, and adjacent to, either the left side or the right side of the inflate membrane 17 (between the base frame 10 and the dump frame 11). In some implementations, the side portions of the U-frame 15 are parallel to one another. In some implementations, the side portions flare out a bit relative to one another as they get closer to the curved rear portion of the U-frame 15 (see, e.g., FIG. 6). The curved rear portion of the U-frame 15 connects the two side portions to one another and extends around the rear wall of the inflate membrane 17. In a typical implementation, the footprint of the U-frame is smaller than the footprint of the bottom portion of the dump frame 11. Thus, when the dump system 9 is in the lowered position (e.g., of FIG. 1), the bottom portion of the dump frame 11 covers an entirety of the U-frame 15. (See also FIG. 6).

In a typical implementation, the U-frame 15 is coupled to and configured to move (e.g., up, and down in a pivoting fashion) with the inflate membrane 17 as the inflate membrane 17 inflates and deflates. For example, FIG. 1 shows the inflate membrane 17 in a deflated state and the U-frame 15 in that figure is shown lying in a horizontal plane between the base frame 10 and the bottom portion of the dump frame 11. When the inflate membrane 17 is inflated, it expands (e.g., from the deflated state in FIG. 1 to the inflated state in FIG. 2). As the inflate membrane 17 expands, the U-frame 15 pivots upward (about U-frame hinge 16), lifted by the expanding inflate membrane 17. FIG. 2 shows the inflate membrane 17 in an inflated state. The U-frame 15 in FIG. 2 is disposed in in an upwardly angled configuration, having pivoted about the U-frame hinge 16 from its horizontal configuration in FIG. 1 to its upwardly angled configuration in FIG. 2. In a typical implementation, the U-frame 15 is physically coupled to the inflate membrane 17 so that when the inflate membrane 17 expands, the U-frame 15 is lifted by the expanding inflate membrane 17. When the inflate membrane 17 once again deflates, the inflate membrane collapses back to a deflated configuration such as the one represented in FIG. 1. As the inflate membrane 17 collapses and moves back to its deflated state (FIG. 1), the U-frame hinge 16 drops or may be pulled down by the deflating inflate membrane 17 back to a lowered position (e.g., a horizontally disposed position, as in FIG. 1).

Figure 6:
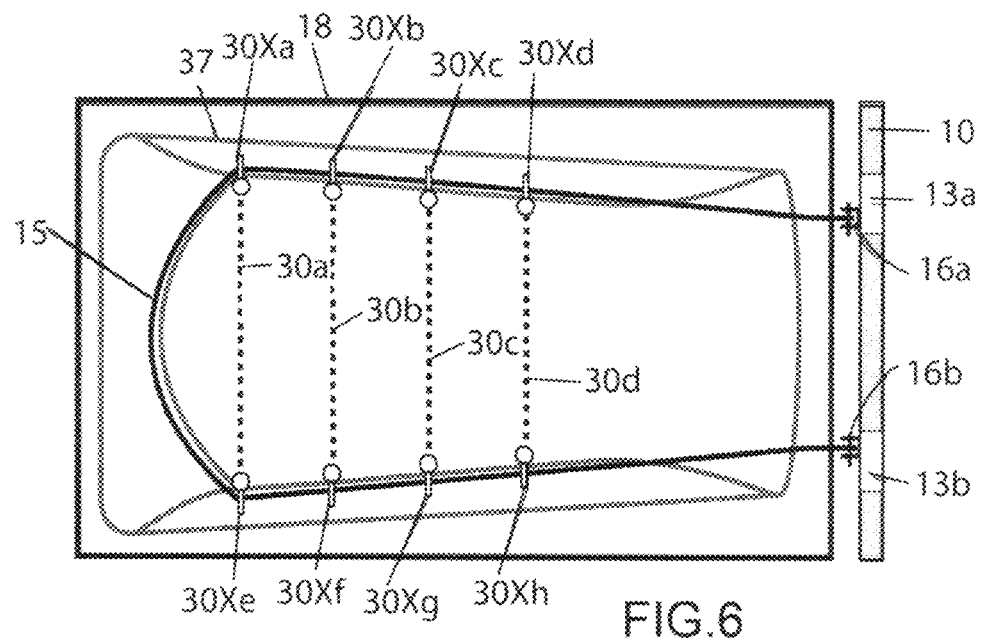
FIG. 6 is a top cross-sectional view showing the use of U-frame interior supports.

There are a variety of ways that the U-frame 15 may be coupled to and configured to move with the inflate membrane 17 as the inflate membrane 17 expands and collapses. One example is represented in FIG. 6 where U-frame interior supports 30a-30d are provided that extend through the inflate membrane 17 from one side portion of the U-frame 15 to the opposite side portion of the U-frame. These U-frame interior supports may help prevent the U-frame 15 from bending outward and possibly breaking under the force of the inflate membrane 17 as the inflate membrane 17 inflates and expands, but they also may help maintain the position of the U-frame 15 relative to the inflate membrane 17 as the inflate membrane expands and collapses.

A wing frame 20 is provided on each side of the dump system 9. Each wing frame 20 is attached to the base frame 10 (e.g., by welding, adhesive, by integral casting, etc.) and, in a typical implementation, each wing frame 20 is a mirror image of the other. The specific configuration of the wing frames 20 can differ depending on a variety of considerations. Typically, the wing frame 20 is configured so that it can control and contain the inflate sidewall folds (e.g., 31Sa-31Sc in FIG. 1) as the inflate membrane 17 deflates and collapses and when the inflate membrane 17 is in the deflated state, as represented in the illustrated implementation. The specific wing frame 20 configuration represented in the illustrated implementation shows each wing frame 20 including a long, thin, rigid structure (e.g., lightweight tubing, rod, etc.) contoured as shown. Each wing frame 20 in the illustrated implementation has a front end and a back end. The front end and the back end are connected to the base frame 10. Moreover, each wing frame 20 has a straight front section that extends upward and outward (e.g., at an angle of between 55 degrees and 85 degrees) from its front connection point on the base frame 10. The wing frame 20 then bends rearward into a section that is long and curved. The long curved section ends at another bend, this one downward, into a straight rear section that extends downward and inward to the rear connection point on the base frame 10. In the illustrated implementation, the straight rear section is longer than the straight front section. The location and distance between the front connection point and the rear connection point can vary and the height—either the maximum height or the height at various points along the length of the wing frame 20—can vary. In the illustrated implementation, the front connection point is close to but just rear of the location of the frontmost vertical dump frame post (e.g., 12d) when the inflate membrane 17 is in the collapsed state, and the rear connection point is close to but just forward of the location of the rearmost vertical dump frame post (e.g., 12b) when the inflate membrane 17 is in the collapsed state. Moreover, the distance between the front connection point and the rear connection point is almost (e.g., at least 85%, at least 90%, at least 95%) of the distance between the forwardmost vertical dump frame post (e.g., 12d in FIG. 1) and the rearmost vertical dump frame post (e.g., 12b in FIG. 1). Moreover, the highest point on the wing frame 20 in the illustrated implementation is high enough to contain the highest point of any of the side folds in the deflated inflate membrane 17 (see, e.g., FIG. 3). In a typical implementation, this height may be at least 10% the height of the container 28, for example.

FIG. 1 shows the inflate membrane 17 (completely deflated) positioned between base frame 10 and dump frame 11 with inflate membrane bottom panel 18 secured to base frame 10 and inflate membrane top panel secured to dump frame 11. Inflate membrane sidewall 37, which is, in an exemplary implementation, about 40 square feet in area, is shown tucked between wing frame 20 and dump frame posts 12b, 12c and 12d with inflate membrane sidewall folds 31Sa, 31Sb, 31Sc, and 31Sd gathered and protected within wing frame 20. Hinge 13 is secured to base frame 10 and dump frame 11 to allow dump frame pivot up and down for dumping as inflate membrane 17 is inflated and deflated with low pressure air from blower 23 (see, FIG. 2). Also shown is U-frame 15, which is secured to inflate membrane sidewall 37 and pivots up and down via U-frame hinge 16 located on or near hinge 13 in various implementations. Dump frame 11 is equipped with dump frame posts 12a, 12b, 12c, 12d, top rail 14 and dump gate 21 as well as dump frame posts 12e (not shown), 12f (not shown), 12g, 12h inserted, top rails 14 and dump gate rail 21 that all form a framework for securing container 28 that is typically made of flexible material such as 40 oz. PVC coated polyester fabric, woven polyester belting and/or rigid materials like metal, fiberglass, wood or plastic. For most applications, container 28 is made of a heavy-duty, abrasion resistant 40 oz. PVC coated polyester fabric having a tensile strength of 725 lbs./inch. Also shown is wheel 25, mounted on wheel bracket 26 that is secured to base frame 10 for moving dump system 9 on and off a vehicle or any other flat surface. The bracket 26 in the illustrated implementation is angled slightly upward so that when the dump system 9 is installed on a flat surface, such as the cargo bed of a vehicle, the wheel 25 is slightly above the flat surface. However, in those implementations, the front end of the dump system 9 can be lifted fairly easily and when that happens, the wheel 25 gets lowered does and onto the flat surface so that the dump system 9 can then be rolled along (e.g., the flat surface) to move the dump system with ease. In a typical implementation, hinge 13 is approximately (or at least) 2" in diameter, which provides enough space between base frame 10 and dump frame 11 for inflate membrane 17 to rest when deflated so that base frame 10 and dump frame remain in parallel.

As can be seen in FIGS. 1 and 2, for example, and as mentioned above, in a typical implementation, the U-frame 15 not only holds and restricts the inflate membrane 17 from going round, almost to an oval shape when a load is placed on it, but also acts as sort of a coat hanger to manage and dictate where and how the folds are created which happens beyond the boundaries of the base frame if allowed. Moreover, the wing frames 20 collect the folds in a very organized and repeatable fashion. Managing the large inflate membrane 17, which produces a lot of force under very low air pressure, also needs to be managed as it deflates and rests between the base frame 10 and dump frame 11. In general, the bigger the bag (that forms the inflate membrane 17), the more power and more folds to deal with.

FIG. 2 shows the dump system 9 with the dump frame 11 elevated (e.g., to about an 80 degree angle) as the inflate membrane 17 is inflated via blower 23. In an exemplary implementation, blower 23 has the capacity to produce about 100 CFM at 3 PSI which typically produces lifting of the container 28 much faster than conventional hydraulic powered dump inserts. Notice that while inflate membrane 17 is almost fully inflated for dumping/emptying container 28 that inflate sidewall membrane fold 31 remains. This fold 31 signifies that inflate membrane 17 is not fully inflated, which in some cases would apply undue and unneeded stress on the seams of inflate membrane 17. Even with a pay load of material such as grass clippings, dirt, mulch, or yard debris having a net weight of 1,500 pounds, the air pressure required for lifting and dumping action of container 28 typically is only about ½ of 1 PSI. Considering that a healthy adult's lung capacity is cable of producing 2 PSI, certain implementations of the inflate membrane 17 or dump system 9 is capable of lifting/dumping a payload weighing 9,000 pounds at 3 PSI. With dump system 9 weighing approximately 200 pounds, an implementation of dump system 9 can lift/dump a pay load 45 times heavier than its own weight. Additionally, U-frame 15 provides a type of exterior skeletal support to inflate membrane 17 as it moves dump frame 11 and container 28 up and down in a symmetrical and repeatable manner. Inflate membrane 17 is inflated and deflated via blower 23 and inflation hose 24 coupled to blower outlet 52. Also shown is wing frame 20 equipped with wing frame panel 27 which provides further protection and side containment to inflate membrane 17.

FIGS. 3, 4 and 5 are end views of dump system 9 with dump frame 11 and container 28 in various lift/dump positions.

In FIG. 3, inflate membrane 17 is shown completely deflated as inflate membrane sidewall folds 31Sa and 31Sb rest inside wing frame 20a while inflate membrane sidewall folds 31Sc and 31Sd rest inside wing frame 20b. To provide extra space for inflate membrane sidewall folds 31Sa, 31Sb, 31Sc and 31Sd to fit easily, the bottom of the dump frame 11 can be made narrower than base frame 10. In some implementations, base frame is 47 inches wide while the bottom of the dump frame 11 is 45 inches wide (so, 2 inches shorter), allowing inflate membrane sidewall folds 31Sa-31Sd gather easily and without any stress and in a repeatable manner.

In FIG. 4, as inflate membrane 17 is inflated, certain inflate membrane sidewall folds (31Sb and 31Sd) are shown actually rising above and beyond dump frame 11 providing lateral support to dump frame 11 in a "cradle like" manner. The inflate action and movement of inflate membrane sidewall folds 31Sb and 31Sd provide support and stability to dump frame 11, which, in an exemplary implementation weighs only about 30 pounds and is made of lightweight, round steel tubing, so that it does not twist, bend, and/or possibly break—especially if there is a heavy and/or uneven load in container 28. Notice that inflate membrane sidewall folds 31Sa and 31Sc also extend beyond the width of at least the bottom of dump frame 11 providing extra support as it provides for a wide base. Together with wing frames 20a and 20b, U-frame 15 helps to keep inflate membrane 17 in a symmetrical, balanced, centered and repeatable position between base frame 10 and dump frame 11.

In FIG. 5, inflate membrane 17 is further inflated and as the front end dump frame 11 extends upward on a repeatable and vertical plane due to the support U-frame 15, inflate membrane sidewall folds 31Sa, 31Sb, 31Sc, and 31Sd shrink and disappear in a symmetrical and repeatable manner. Even with a pay load of as much as 3,000 pounds in container 28, the air pressure inside inflate membrane 17 in an exemplary implementation may be only around 1 PSI which results in virtually stress-free operation of the inflate membrane 17.

FIG. 6 is a top view showing the use of U-frame interior supports 30a, 30b, 30c, and 30d which, in some implementations, allows U-frame 15 to be made of lightweight tubing (instead of needing to be sturdier and heavier). In keeping with the ultra-lightweight nature of certain implementations of the dump system 9, U-frame interior supports 30a to 30d help prevent U-frame 15 from bending outward and possibly breaking under the force of the inflate membrane 17 as the inflate membrane 17 expands via inflation from blower 23 (see, e.g., FIG. 2). Note that, in the illustrated implementation, U-frame 15 is narrower than dump frame 11. In some implementations, U-frame 15 is about 35 inches wide at its widest and dump frame 11 is 45 inches wide. In some implementations, this helps ensure inflate membrane 17 will rise vertically to a desired (or required) height as well as providing for controlled folding of inflate membrane 17 as the inflate membrane 17 deflates. U-frame interior support(s) 30a to 30d may be made of steel cable connected to threaded eye hook fasteners and lock nuts 30Xa to 30Xh that attach to opposite sides of the U-frame. U-frame interior supports 30a to 30d can also be made of rigid material such as steel, aluminum, or plastic. In a typical implementations, there are small holes in the side panels of inflate membrane 17 that allow for passage of the U-frame interior supports 30a to 30d and/or their fasteners to pass into and out of inflate membrane 17. Typically, those holes are only large enough to allow the requisite hardware to pass through them with very little space around the hardware.

Figure 7:
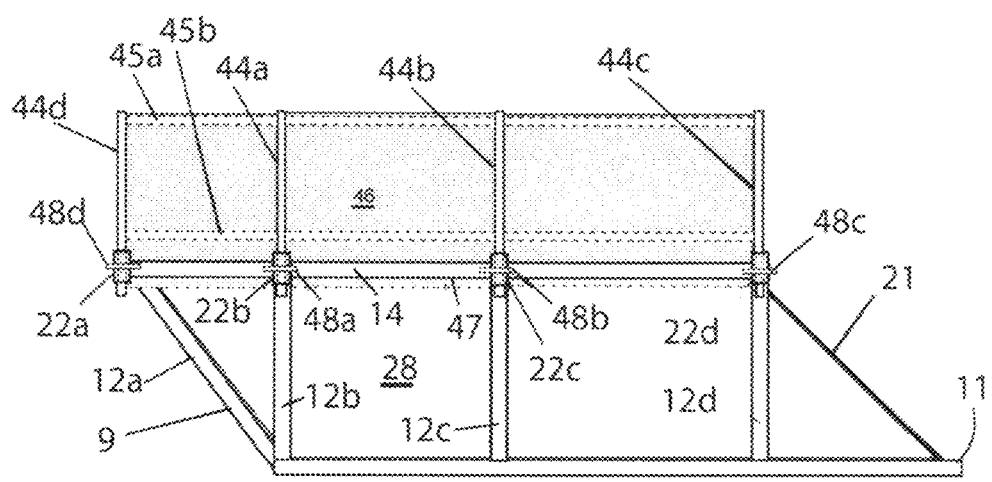
FIG. 7 is a side view of the dump system with extension wall secured to top rail of dump frame.

FIG. 7 is a side view of dump system 9 with an extension wall 46 secured to the dump system 9 atop the top rail 14 of dump frame 11. The illustrated extension wall 46 includes an extension wall frame and extension wall panel coupled to and supported by the extension wall frame. The extension wall frame includes an upper extension wall rail 45a, a lower extension wall rail 45b, and a plurality of extension wall posts 44a-44d. The upper extension wall rail 45a is at or near the top of the extension wall 46 and the lower extension wall rail 45b is near the bottom of the extension wall 46 and parallel to the upper extension wall rail 45a. Each extension wall post 44a-44d extends between and connects the upper extension wall rail 45a and the lower extension wall rail 45b. Each extension wall post 44a-44d is parallel to, and spaced apart from in a longitudinal direction, the other extension wall posts. Moreover, each extension wall post 44a-44d is perpendicular to the upper extension wall rail 45a and the lower extension wall rail 45b. The extension wall panel, which is coupled to and supported by the extension wall frame, may be made of a flexible material such as PVC coated fabric or a rigid material such as steel, aluminum, plastic, or wood.

The extension wall 46 may be part of an extension accessory 47 that can be attached to the top of the dump frame 11 (as shown) to increase the effective storage capacity of the dump system and the container 28. In an exemplary implementation, the extension accessory 47 may include four extension walls, only one of which (extension wall 46) is shown in FIG. 7. These extension walls may be arranged relative to one another to define an additional, extension storage space that is cubic in shape, extending upward from an open top of container 28, and surrounded by the four extension walls. The extension accessory 47 may have an open or closed (e.g., with a fabric or other material cover) top.

Each of the four walls may be rectangular in configuration, with the extension wall opposite extension wall 46 having a configuration that is a mirror image of the configuration of extension wall 46. The other two extension walls—one at the front of the extension storage space and one at the rear of the extension storage space—are also typically rectangular, but typically smaller in overall width than extension wall 46. The extension walls may be coupled to one another in any one of a variety of different ways, including ways that are similar to those indicated herein for coupling together the walls of container 28.

The extension wall, in the illustrated implementation, is coupled to the top of the dump frame 9 with a coupling configuration that includes sidewall extension brackets 22a-22d and lock pins 48a-48d. In various implementations, the sidewall extension brackets 22a, 22b, 22c and 22d may be permanently or temporarily attached to top rail 14 to accept extension wall posts 44d, 44a, 44b and 44c respectively. As shown, extension wall rails 45a and 45b are secured to extension wall posts 44d, 44a, 44b and 44c to form a frame to hold extension wall 46, which, as mentioned above, may be made of a flexible material such as PVC coated fabric or a rigid material such as steel, aluminum, plastic or wood. To hold extension wall 46 in place and secure to top rail 14, the lock pins 48d, 48a, 48b and 48c may be placed through sidewall extension brackets 22a, 22b. 22C and 22d as well as extension wall posts 44d, 44a, 44b and 44c respectively. Additionally, as mentioned above, the extension accessory, with the extension wall 46, may also be in the form of a closed enclosure with top and back panels (not shown) and also may have one or more closable openings for handling ground up leaves and other materials in bulk. The closable openings may be in the top or any other panel and may include one or more fabric (or other material) flaps or covers that can be moved or swung (e.g., on a hinge) out of the way to allow access through an opening in the extension access into an interior space.

Figure 8:
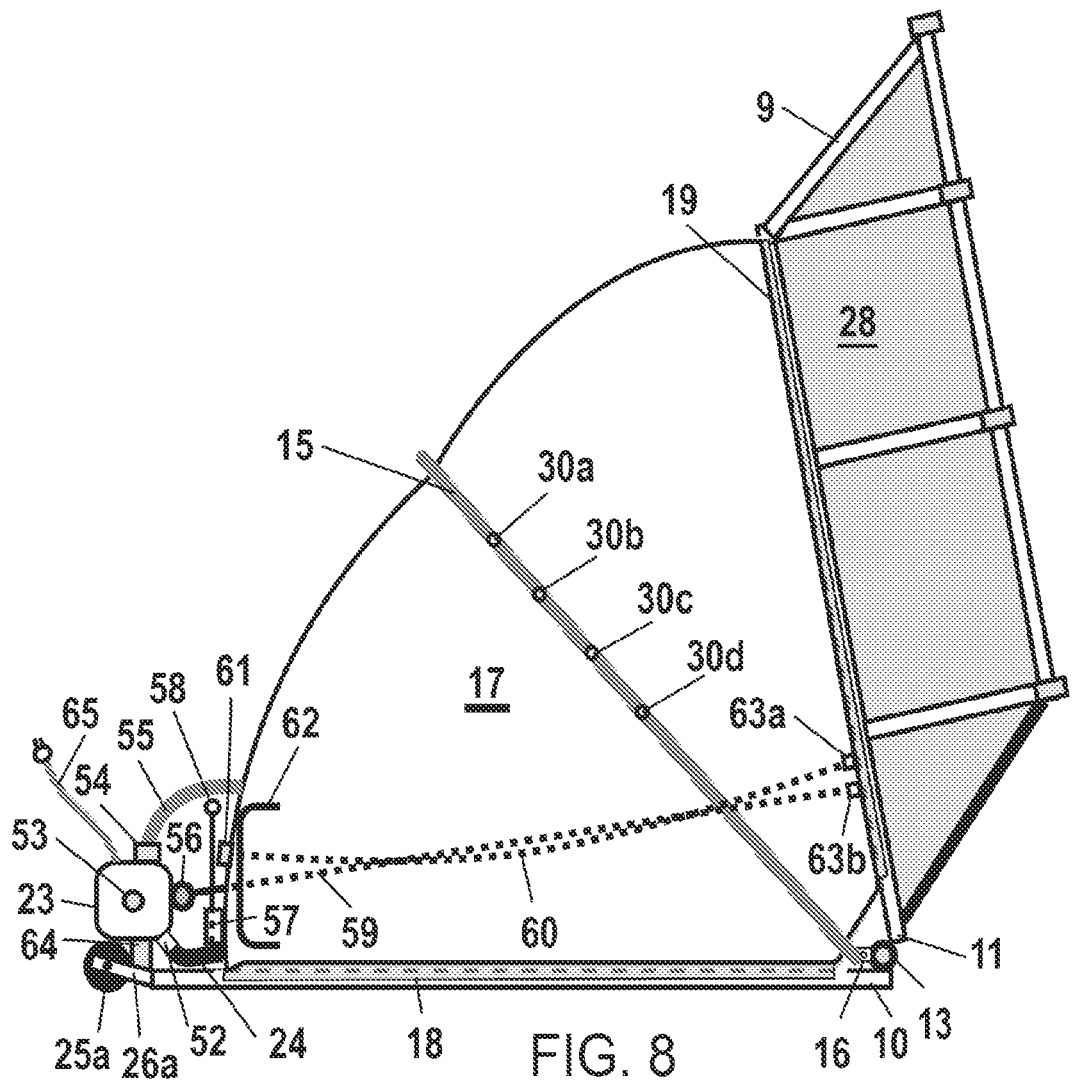
FIG. 8 is a side view of the dump system showing additional functional elements of the dump system.

FIG. 8 is a schematic side view representation of dump system 9 that shows various features of dump system 9 including some that help prevent the inflate membrane 17 from becoming over-pressurized, which otherwise might present a risk of rupturing.

The inflate membrane 17 in FIG. 8 is almost fully inflated between base frame 10 and dump frame 11 creating a dump angle of about 85 degrees. The phrase dump angle refers to the angle between the base frame 10 and the dump frame 11. As shown, blower 23 is mounted over wheel 25a off to the side of rear end of base frame 10 so that inflate membrane folds 31Ra, 31Rb, 31Rc and 31Rd (not shown) have a convenient place for storage when deflated. Even though dump system 9 may be designed to lift payloads in the 1,500 to 2,500 pound range under very low air pressures (e.g., 1·WC or 1 inch of water for every 100 pounds), blower 23 may, in some implementations, have the capacity to produce pressures of up to 4 PSI. At 4 PSI of air pressure, especially when no load is present in dump system 9, inflate membrane 17 could cause damage to U-frame 15, base frame 10, dump frame 11 and/or to itself. With inflate membrane 17 having a surface area of approximately 185 square feet and at 4 PSI (576 lbs./sq. ft.×185 square feet) could build an outward force of approximately 106,560 pounds. To prevent an over-pressurized condition of inflate membrane 17, blower 23 and inflate membrane 17 are governed by safety provisions utilizing high pressure switch 54, pressure relief valve 61, and blower shut off switch 56. In various implementations, any one or more (or all) of these safety provisions may be incorporated into the dump system.

Referring again to the illustrated implementation, a max dump cable 59 is connected between a cable anchor 63b on a bottom surface of dump frame 11 and the blower shut off switch 56. The blower shut off switch 56 is configured to shut off the blower 23 when the max dump cable 59 pulls on the blower shut off switch 56. When dump frame 11 reaches a maximum dump angle, the max dump cable 59 becomes taut and pulls on the blower shut off switch 56, which causes the blower 23 to shut off. Max dump cable 59 is located inside of inflate membrane and runs through rear wall of inflate membrane (e.g., via an airtight opening in a rear surface of the inflate membrane 17) to blower shut off switch 56. In a typical implementation, the length of the max dump cable 59, along with the position of the cable anchor 63b and the position of the cable's connection point to blower shut off switch 56 determine the maximum dump angle in a particular implementation.

In some implementations, safety provisions involving the pressure relief valve 61 provide a backup to the safety provisions related to the blower shut off switch 56 just discussed. In the illustrated implementation, the safety provisions involving the relief valve 61 include the relief valve 61 itself, a pressure relief cable 60 that extends from the pressure relief valve 61 to a cable anchor 63a on a bottom surface of the dump frame 11. The pressure relief valve 61 is a valve mounted to an opening in a rear surface of the inflate membrane 17. The pressure relief valve 61 is configured to be normally closed, but to open in response to being pulled by pressure relief cable 60. Thus, in such an implementation, if the max dump cable 59 and/or blower shut off switch 56 were to fail, dump frame 11 would continue to move upward at a steeper angle pulling pressure relief cable 60 taut causing pressure relief valve 61 to open eventually allowing the air to exhaust from the inflate membrane 17. In a typical implementation, the length of the pressure relief cable 60, along with the position of the cable anchor 63a and the position of the cable's connection point to pressure relief valve 61 determine the dump angle, at which the pressure relief valve 61 opens, in a particular implementation.

Safety provisions involving high pressure switch 54 provide another safety measure against the inflate membrane 17 becoming over-pressurized. In the illustrated implementation, the safety provisions involving the high pressure switch 54 include the high pressure switch 54 itself, and a high pressure tube 55 that extends between the high pressure switch 54 and an opening in a surface of the inflate membrane 17. The high pressure tube 55 serves as a fluid communication path that conveys pressure from the inside of the inflate membrane 17 to a pressure sensing element of the high pressure switch 55, which is configured to shut down the blower 23 in response to a sensed pressure reaching a predetermined pressure shut down value. Thus, in a typical implementation, to prevent over pressurization of inflate membrane 17, pressurized air from inflate membrane 17 runs through high pressure tube 55 to high pressure switch 54. High pressure switch 54 may be adjusted according to the type of load and weight capacity of a vehicle to prevent operation of dump system 9 from being overloaded. For example, if a certain truck has the capacity to haul a maximum payload of 2,000 pounds, then pressure switch can be set to 20·WC (2,000/1·WC/100 lbs.) so if pressure exceeds that, blower shuts off and most importantly dump system 9 will not dump adding another level of safety. In this case, the operator would have to remove part of the load until it was under 2,000 pounds and less than 20·WC of air pressure. This added safety feature also allows the operator to weigh his/her payload before leaving a job site with a heavy and unsafe load. While dump system 9 is being loaded, the operator can turn the blower 23 to see if high pressure switch 54 is activated and shuts down blower 23 or by monitoring a pressure gauge (not shown) on dump system 9. The pressure gauge could be attached, for example, to the high pressure tube 55 or to the inside of the inflate membrane 17 via some other tube. In some implementations, the safety provisions involving high pressure switch 54 provide a backup in case the safety provisions related to the blower shut off switch 56 and/or pressure relief valve 61 fail.

The illustrated implementation includes a zipper opening 62 in the inflate membrane 17. The zipper opening 62 is an opening in a wall of the inflate membrane 17 with a zipper configured to effectively close or open the opening. Opening the zipper enables a user to access an interior of the inflate membrane 17, the space therein, and any components of the dump system 9 that are inside the inflate membrane 17. Closing the zipper closes off such access. In an exemplary implementation, the zipper opening 62 provides access to adjust and/or to perform repairs to inflate membrane 17, max dump cable 59, pressure relief cable 60, pressure relief valve 61, and/or exhaust valve 57. In some implementations, a swab of removable caulk is applied over zipper opening 62 to prevent air from leaking out of the inflate membrane 17 through the zipper opening 62. In an exemplary implementation, blower 23 is a 115V fractional horsepower vacuum cleaner type motor requiring about 12 amps which can create a flow of pressurized air at about 100 CFM at 20 degrees C. Blower 23 is equipped with power cord 65. Experience has shown that at 100 CFM, blower 23 is capable of performing the dumping of dump system 9 even if small leaks are present in inflate membrane 17.

The illustrated implementation also has a hand-operated exhaust valve 57 configured to control flow through an exhaust opening in inflate membrane 17. The hand-operated exhaust valve 57 has an exhaust valve handle 58 that is movable between a closed position, in which the exhaust valve 57 prevents air flow through the exhaust opening in the inflate membrane 17, and an open position, in which the exhaust valve 57 permits air flow through the exhaust opening in the inflate membrane 17 (and through the exhaust valve itself). Operation of the hand-operated exhaust valve 57 gives the user the opportunity, for example, to manually relieve pressure from the inflate membrane 17.

In some implementations, including those in which an exhaust valve 57 is present, inflation hose 24 is equipped with a one-way check valve (not shown in FIG. 8) to prevent the back flow of air out of inflate membrane 17 via inflation hose 24 and blower 23 to atmosphere. The use of one-way check valve in this regard will help hold the dump angle of dump frame 11 fixed in place. In this configuration, dump frame 11 and container 28 can be lowered by opening exhaust valve 57 to allow air inside of inflate membrane 17 to vent to atmosphere. To speed up the deflation process, exhaust valve 57 may be equipped with (or connected to) an auxiliary blower (not shown) operating in a vacuum mode (e.g., to suck air out of the inflate membrane 17 more quickly than air would passively flow out of inflate membrane 17 through the exhaust valve 57 alone. In some implementations, the inflation hose 24 does not have a check valve. In those implementations, the inflate membrane 17 can be deflated by simply shutting off the blower 23 and allowing air to exit the inflate membrane 17 through the inflation hose 24 and blower 23 to atmosphere.

Figure 9:
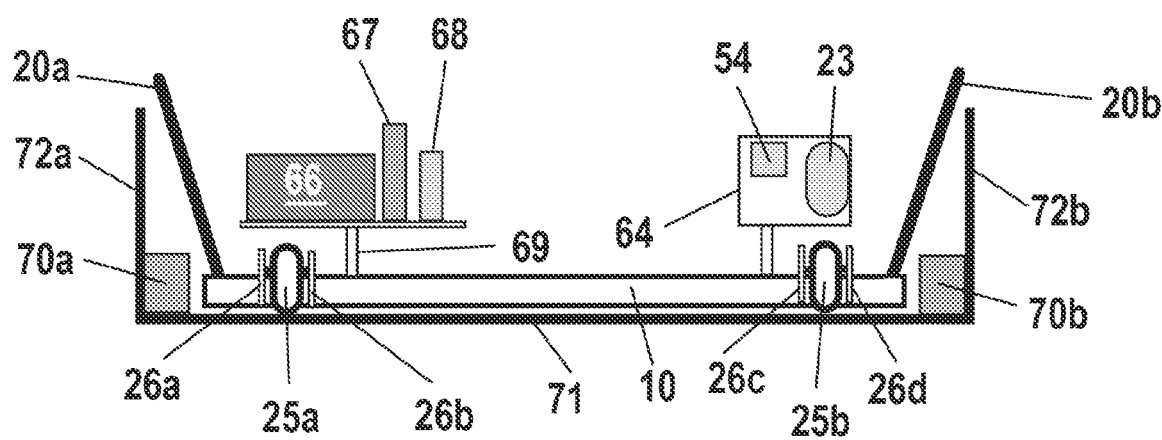
FIG. 9 is an end view of the base frame of the dump system against the cab of a vehicle.

FIG. 9 is a partial, schematic, end view of a dump system 9 in a cargo bed 71 of a vehicle.

According to the illustrated implementation, base frame 10 of dump system 9, which may be against the cab of the vehicle, is installed between wheel wells 70a and 70b on the cargo bed 71 (e.g., between cargo bed walls 72*a* and 72*b*). Wing frames 20*a* and 20*b* in the illustrated implementation are fixed to base frame 10 at about a 68° angle so that they clear wheel wells 70*a* and 70*b* but stick out enough from base frame 10 to catch and store inflate membrane folds 31Sd to 31Sh (not shown in FIG. 9 but see, e.g., FIG. 1 and FIG. 3) of inflate membrane 17 (not shown in FIG. 9) when deflated. In some implementations, dump system 9 can be powered by the vehicles' 12V battery and separate power inverter system (preferably located on the back window of the vehicles' cab either inside or outside) via the use of a rigid or flexible enclosure with suction cups, in some implementations such as the illustrated implementation, base frame 10 of dump system 9 can be equipped with battery bracket 69 to hold battery 66, power inverter 67. and battery charger 68 for operation independent of the vehicle. Also shown is blower bracket 64 fixed to base fame 10 which holds blower 23 and high pressure switch 54. Notice that the center area above base frame 10 is open for inflate membrane folds 31Ra, 31Rb, 31Rc and 31Rd (not shown in FIG. 9 but see, e.g., FIG. 1).

Figure 10:
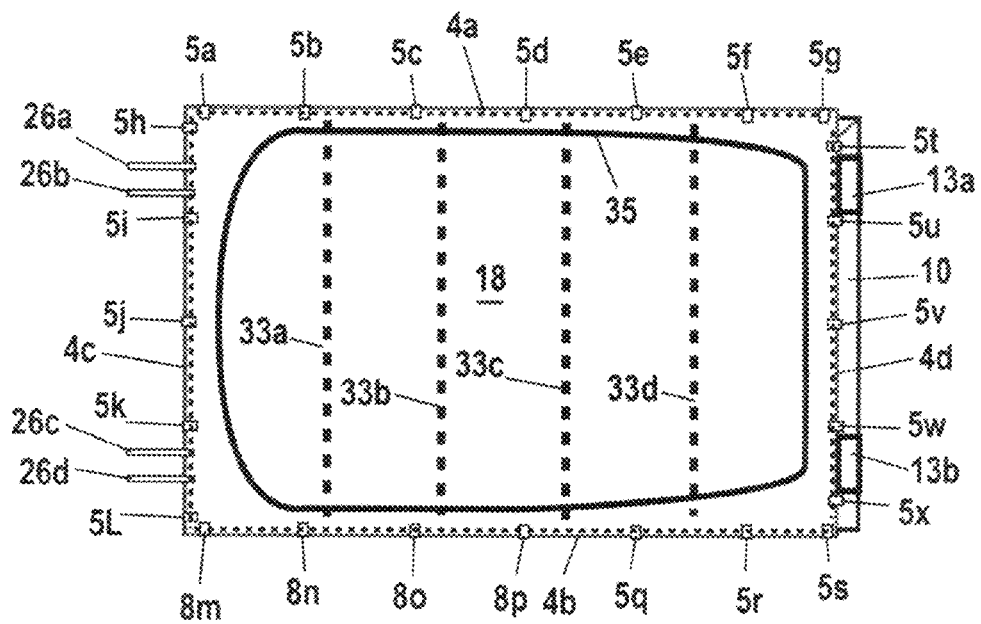
FIG. 10 is a top cross-sectional view of the base frame with inflate membrane bottom panel.

FIG. 10 is a top view of base frame 10 with inflate membrane bottom panel attached around its perimeter via rod anchors 5*a* to 5*x* welded to base frame 10 with rods 4*a* to 4*d* extending through rod loops 38 (not shown in FIG. 10 but see, e.g., FIG. 11 and FIG. 12) on the edge of inflate membrane bottom panel 18 as well as rod anchors 5*a* to 5*x* (e.g., in a similar manner as to hanging a curtain on a curtain rod), resulting in relatively equal tension with no significant concentrated loads which could rip and/or damage inflate membrane bottom panel 18. Also shown are base frame cross supports 33*a*, 33*b*, 33*c*, and 33*d* which are added to base frame 10 and/or dump frame 11 in some implementations. For some applications it may be desirable and/or required to use a rigid floor panel 99 between inflate membrane bottom panel 18, inflate membrane top panel and/or between the bottom side of container 28 and frame cross supports 33*a*, 33*b*, 33*c* and 33*d*. Rigid floor panel 99 can be made of metal sheet, Fiberglass FRP panels or wood. Also, in some applications metal sheet, rubber sheet, conveyor belting, wood and FRP can be used on the floor and interior sidewalls of container 28. Inflate membrane sidewall perimeter joint/seam 35 is where inflate membrane sidewall 37 (see FIGS. 11 and 12) is attached to inflate membrane bottom panel 18 (e.g., via gluing, heat sealing and/or sewing) is generally rectangular in shape, its corners are rounded to also help prevent concentrated loads in those areas when inflate membrane is pressurized. Notice hinges 13*a* and 13*b* on the right side of base frame 10 with wheel brackets 26*a*, 26*b*, 26*c* and 26*d* on the opposite end. In addition to using the rod 4, rod anchor 5 and rod loop flap 38 method around the perimeter of inflate membrane 17 to prevent concentrated loads is that inflate membrane 17 can also be easily and quickly removed simply removing rods 4*a* to 4*d* with no tools required.

Figure 11:
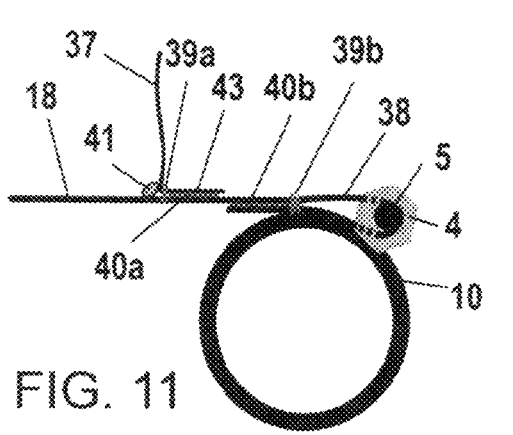
FIG. 11 is a close up end view of base frame tubing.

FIG. 11 is a close up end view showing an exemplary implementation of how the base frame 10 is coupled to the inflate membrane 17.

Base frame 10 tubing, according to the illustrated implementation, is shown with rod anchor 5 welded on with rod 4 extended through it as well as through rod loop 38 of inflate membrane bottom panel 18. Rod loop 38 is secured via stitch 39*b* and adhesive 40*b*. Also shown is inflate membrane sidewall 37 attached to inflate membrane bottom panel 18 via stitch 39*a* with adhesive 40*a* under inflate sidewall flap 43. To prevent air from leaking through stitch 39*a*, a sealant (e.g., 41) such as foam butyl tape is secured over it (e.g., at the interface of inflate membrane sidewall 37 and inflate membrane bottom panel 18). Normally, inflate devices need to be glued or heat sealed to prevent air leakage through seams, however, because inflate membrane 17 is designed to operate at such low air pressures (0 to 1 PSI) there is very little stress on stitched seam 39*a* another advantage in using extremely low air pressure for operation.

Figure 12:
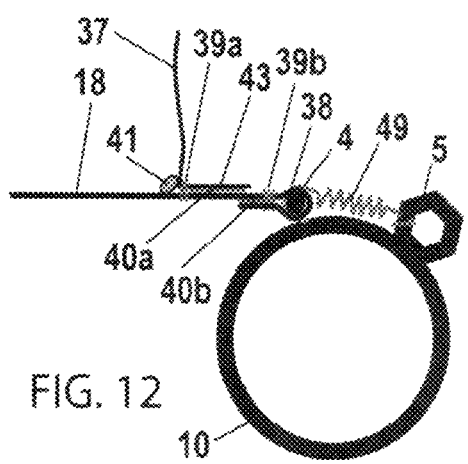
FIG. 12 is a close up end view of base frame tubing with spring connected between rod and rod loop.

FIG. 12 is a close up end view showing an alternative exemplary implementation of how the base frame 10 is coupled to the inflate membrane 17. The arrangement represented in FIG. 12 is similar in several respects to the arrangement represented in FIG. 11. However, the FIG. 12 implementation includes a spring 49 connected at one end between rod 4 and rod loop 38 and connected at the opposite end to rod anchor 5. This arrangement may help provide added tension to inflate membrane bottom panel 18 if desired.

While inflate membrane sidewall 37 can be made from a 22 oz. PVC coated fabric, for example, because it tends to fold easier and is less bulky than certain other fabrics, inflate membrane bottom panel 18 may, in some implementations, be made of a much heavier 40 oz. Polyester woven fabric having a tensile strength almost twice that of the 22 oz. Fabric. Unlike PVC coated Nylon woven fabric that can stretch up to 4%, PVC coated polyester woven fabric tends to be more stable (e.g., less stretchable).

FIGS. 13, 14, and 15 show an exemplary implementation of a storage rack 77 (e.g., for dump system 9).

Some of the main components of the illustrated storage rack 77 include rack legs 81*a*, 81*b*, a rack frame (e.g., 80*a*, 80*b*, 78, 90*a*, 90*b*) atop and supported by the rack legs, a roller frame assembly 100*a*, 100*b* atop and supported by the rack frame, rollers 85*a*-85*h* supported by the roller frame assembly 100*a*, 100*b* (a roller exterior frame 83 portion of the roller frame assembly 100*a*, 100*b* extends above and surrounds the rollers), and a stop 89 at a far end of the storage rack 77.

The rack legs 81*a*, 81*b* are configured to contact a vertical surface (e.g., the ground) and to support the rest of the storage rack 77 and any dump system (e.g., 9) that may be placed stop the storage rack 77. Each rack leg 81*a*, 81*b* in the illustrated implementation has a leg coupler 79*a*, 79*b* that contacts the surface that the rack leg rests upon. Each rack leg has a locking pin (e.g., 86*b*) that helps secure the rack leg to the leg coupled 79*a*, 79*b*. Leg sleeves (e.g., 82*a*, 82*b*) are provided at an upper end of each rack leg 81*a*, 81*b* and contact a bottom side of rack frame elements 80*a*, 80*b*. Lock chains 87*a*, 87*b* are connected to the legs and to a lock flange 88, as shown.

Rack frame includes rack frame elements 80*a*, 80*b* that extend inwardly from opposite lateral edges of the storage rack 77 (above the rearmost leg sleeves 82*a*, 82*b*), a frame coupler 78 (with a locking pin 86*a*) between and connecting the inner edges rack frame elements 80*a*, 80*b*, beams 90*a*, 90*b* that extend from and connect the inner ends of the rack frame elements 80*a*, 80*b* to front portions of the roller frame assemblies 100*a*, 100*b*, respectively (e.g., near the frontmost leg sleeves 82*b*, 82*d*). More specifically, in the illustrated implementation, beam 90*a* is fixed to rack frame 80*b* and roller frame assembly 100*a*, and beam 90*b* is fixed to rack frame 80*a* and roller frame assembly 100*b*.

The roller frame assemblies 100*a*, 100*b* extend lengthwise along the storage rack 77 parallel to one another and laterally separated from one another so that one of the roller frame assemblies is on a right side of the storage rack 77 while the other one of the roller frame assemblies is on a left side of the storage rack 77. Each roller frame assembly 100*a*, 100b has a roller interior frame (e.g., 84a, 84b), a roller exterior frame (e.g., 83a, 83b), and a roller (e.g., 85a-85b). In a typical roller frame assembly (e.g., as shown in the figures), the roller interior frame and the roller exterior frame cooperate (e.g., which each having a corresponding supporting/bearing surface) to support a shaft of the corresponding rollers. Each roller is supported on that shaft and able to rotate about an axis defined by its shaft. Moreover, each roller frame assembly 100a, 100b is configured so that an object, such as dump frame 9 (see, e.g., FIGS. 13 and 14) can be supported on and roll along the top of the storage rack 77 via the rollers, which rotate as the dump frame 9 moves along across the top of the storage rack 77. More specifically, in the implementation represented in FIGS. 13 and 14, it can be seen that the base frame 10 of the dump system 9 contacts the rollers and causes them to rotate (or roll) as the dump system 9 is moved onto or off of the storage rack 77.

Each roller frame assembly 100a, 100b typically supports multiple rollers and each of those rollers is parallel to all the other rollers supported by the roller frame assembly. For example, in the illustrated implementation, roller frame assembly 100a supports four longitudinally-displaced rollers 85a-85d and roller frame assembly 100b supports four other longitudinally-displaced rollers 85e-85h. Rollers 85a-85d are parallel to one another and rollers 85e-85h are parallel to one another. Each roller is located laterally across from and aligned with another roller. For example, roller 85a is located laterally across from and aligned with roller 85e, roller 85b is located laterally across from and aligned with roller 85f, roller 85c is located laterally across from and aligned with roller 85g, and roller 85d is located laterally across from and aligned with roller 85h.

The stop 89 is a rigid panel at a front end of the storage rack 77 that extends upwardly to provide a barrier for any object (e.g., dump system 9) being rolled onto the storage rack 77.

FIGS. 13, 14, and 15 are various views of how an implementation of storage rack 77 (e.g., for dump system 9) interfaces with truck 6 to accommodate the loading and unloading of dump system 9. FIG. 13 shows storage rack 77 placed so that its upper support surface is slightly above and so that the storage rack 77 is against tailgate 51 of truck 6 with the right end of dump system 9 resting on roller 85a of storage rack 77 while wheel 25 on dump system rests on cargo bed 71. Because roller 85a is higher than truck bed 71, dump system 9 is elevated above truck bed 71 so it can roll easily and supported via by wheels (25) and rollers (85). Once dump system 9 is moved past wheel 85a (moving onto truck 6), it will slide down slide bracket 91 for placement on truck bed 71. Also, because dump system 9 is light (e.g., weighing in some implementations only 200 pounds) and has wheels (e.g., 25), it is easy to reposition, if necessary, on truck bed 71 by the user. Even when loaded with up to 1,000 pounds of cargo, for example, dump system 9 is very easy and safe to move between rack 77 and cargo bed 71. Storage rack 77 is supported via adjustable rack legs 81a and 81b with adjustable lock chains 87a and 87b connecting to lock flange 88.

In view of the foregoing, it can be seen that a user who has the storage rack 77, a vehicle 6 with a flatbed or a trailer, and the dump system 9 may position the dump system 9 on the vehicle's 6 flatbed or trailer or onto the storage rack 77, positioning a rear end of the vehicle's 6 flatbed or trailer adjacent to a loading end of the storage rack 77, and transfer the dump system 9 back and forth between the vehicle's 6 flat bed or trailer with ease (e.g., without having to lift the entire dump system 9 in the air). As is apparent from the exemplary implementation represented in FIG. 13, no matter where in the transfer the dump system 9 is, the dump system 9 is in direct physical contact with either a surface of the vehicle's 6 flatbed or trailer, the storage rack 77, or both. More specifically, at every point of time during such a transfer (between the vehicle's 6 flatbed or trailer and the storage rack 77), some portion of the dump system 9 is in contact with an upper surface of the vehicle's 6 flatbed or trailer or some portion of the rollers 85a-85h on the storage rack 77. Moreover, although the illustrated implementation shows an implementation of dump system 9 disclosed herein being moved between the vehicle's 6 flatbed or trailer and the storage rack 77, it should be understood that the storage rack 77 could be utilized in this manner with any one of a variety of other types of dump systems 9 including, for example, those that utilize a hydraulic system, rather than an air pressure system, to move the container (e.g., up and down). The power inverter 67 is shown in FIG. 13 located near rear window 98 of truck 6.

FIG. 14 is a front view of an implementation of dump system 9 (having container 28 made of metal sheet fixed to dump frame 11 with wheels 25a and 25b shown along with hinges 13a and 13b) resting rack frame 80 on rack frame sections 80a and 80b held together via frame coupler 78 and locking pin 86a. Also shown is leg coupler 79 and locking pin 86b that holds rack legs 81a and 81b. For disassembling, locking pins 86a and 86b can be removed from frame coupler 78 and leg coupler 79. Once couplers 78 and 79 are unfastened, rack leg 81a and rack leg 81b can be removed from leg sleeves 82a and 82b.

As a safety feature so that dump system 9 does not slide off storage rack 77, roller exterior frames 83a and 83b in the illustrated implementation are higher than rollers 85a and 85b and extend above base frame 10 while roller interior frames 84a and 84b are lower than rollers 85a and 85b so as not to impede or block dump system 9 from being moved on or off storage rack 77.

Also shown are tie downs straps 29a and 29b secured to wing frame 20a and 20b for securing dump frame 9 to storage rack 77 (or elsewhere). Ratchet adjusters 74a and 74b are shown secured to the tie down straps 29a and 29b for tightening and loosening purposes.

FIG. 15 is a top view of storage rack 77 showing leg sleeves 82a and 82b fixed to roller exterior frame 83a and roller interior frame 84a with rollers 85a, 85b, 85c and 85d installed. Leg sleeves 82c and 82d are fixed to exterior roller frame 83b and interior roller frame 84b with rollers 85e, 85f, 85g and 85h installed. To provide further support to rack frame 77, beam 90a is fixed to rack frame 80b and roller frame assembly 100a and beam 90b is fixed to rack frame 80a and roller frame assembly 100b. Notice that center area of rack frame 77 is open for the user to pull and push dump system 9 on and off storage rack 77.

Figure 16:
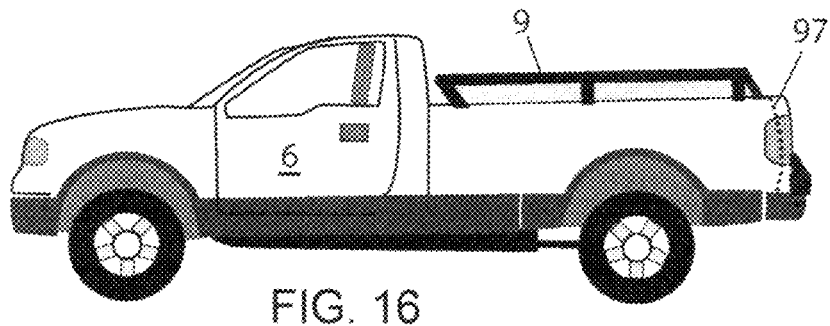
FIG. 16 is a side view of the dump system installed on a pick-up truck.
Figure 17:
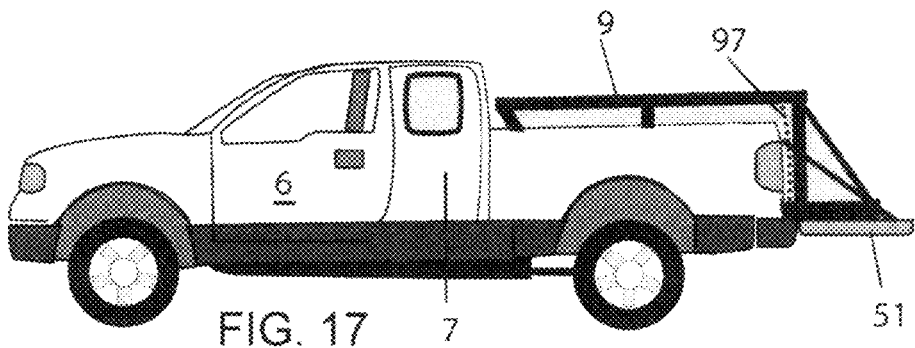
FIG. 17 is a side view of the dump system installed on a half-ton truck.
Figure 18:
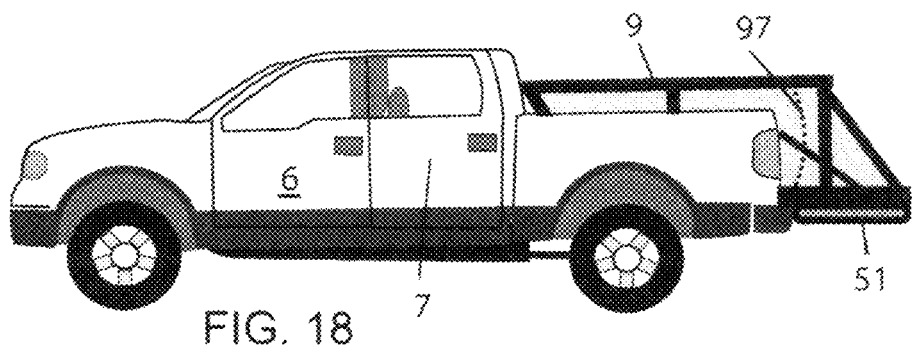
FIG. 18 is a side view of the dump system installed on an alternative implementation of a truck.

FIGS. 16, 17 and 18 are side views of different models of pick-up trucks 6 with dump system 9 installed in each one.

In FIG. 16, dump system 9 is installed in pick-up truck 6 having a driver and passenger seat only with a long cargo bed. This truck 6, which is generally a one-ton, super duty model (generally used for a hydraulic, 900 pound dump insert) has dump system 9 installed. In this configuration, the tailgate is removed. Adjustable dump gate 97 is placed in a vertical position before tailgate.

In FIG. 17, truck 6 is a ½ ton model with a small bench seat behind the driver's seat with dump system 9 installed and extending onto tailgate 51. In this configuration, adjustable dump gate 97 is also secured in front of tailgate 51.

FIG. 18 is truck 6 which is a model with a quad cab design also with adjustable dump gate 97 position and secured in front of tailgate 51 to also keep the payload over the cargo bed and not on the tailgate for safe driving.

FIG. 19 is a side view of truck 6 and low boy, flatbed trailer 94 with dump system containers 28a, 28b and 28c secured to trailer via tie down straps 29a, 29b, 29c, 29d, 29e and 29f. In this configuration, dump systems 9a, 9b and 9c are equipped with container top enclosures 96a, 96b and 96c with fill hatch openings 93a, 93b and 93c installed, respectively. For hauling materials like dirt that can be dumped directly on the ground rather than into specialized conveying system, containers 28a, 28b and 28c can be combined as a single container 28, measuring approximately 8' wide×40' long, for example. For materials that require a contamination-free environment, a poly liner (not shown) may be used inside containers 28a, 28b and 28c.

FIG. 20 is and end view of dump system 9 installed on cargo bed 71 of trailer 94. As shown, in this configuration, container 28 is an enclosed metal structure with dump gate 92' that is configured to open (e.g., by swinging about a hinge) as inflate membrane 17 is inflated during the dumping/emptying process. In some implementation, the illustrated dump system 9 may include a latch or the like to keep the dump gate 92 in a closed position until dumping is desired and intended. U-frame bracket 15 and wing frame 20, for example, help allow inflate membrane 17 to be large and operate under very low pressure. Base frame 10 is secured to cargo bed for safe and secure transport as well allowing dump frame 11 to incline safely. The dumping direction in the illustrated figure is to the side (not the back) of the illustrated vehicle. In some implementation, a dump system may be configured to include a container with a rear discharge (as shown and described in connection with some other drawings) as well as one or more side discharges (right side and/or left side) as shown and described in connection with FIG. 20.

FIG. 21 is a side view of dump system 9 with inflate membrane 17 partially inflated with U-frame 15 and wing frame 20a working together to facilitate operation of large inflate membrane 17. For many applications, a rigid and solid floor of dump frame 10 and/or dump frame 11 is not required because the inflate membrane bottom panel 18, inflate membrane top panel 19 and container floor 28X fitted tightly to base frame 10 and dump frame 11 in a taut manner using a very heavy duty (e.g., 40 oz.) PVC coated polyester woven fabric having high tensile strength (e.g., about 725 pounds per inch). The actual container floor 28X can easily accommodate a payload of several hundred pounds/sq. ft. of bulk materials because the three layers of heavy-duty fabric have a combined tensile strength of approximately 2,175 pounds per square inch. As shown, all fabric components including inflate membrane bottom panel 18, inflate membrane top panel 19, and container 28 of dump system 9 are attached to base frame 10, dump frame 11 and top rail 14 of dump frame 11 via a system made up of rod(s) 4, rod anchor(s) 5 and rod loop(s) 38. The container in the illustrated implementation has a container top 96 and a fill hatch opening 93.

Figure 22:
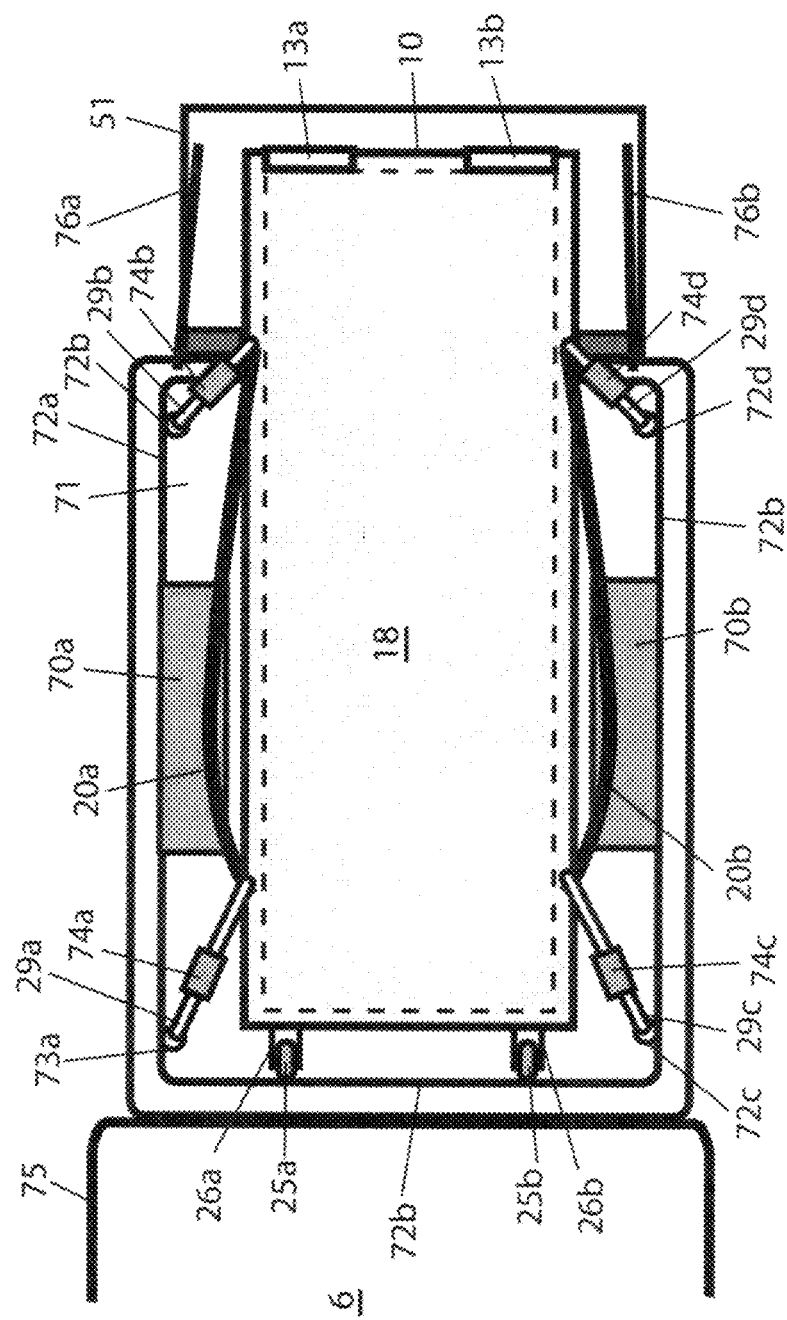
FIG. 22 is a top view of a dump system installed on a truck.

FIG. 22 is a top view of a cargo bed 71 of a truck 6 with base frame 10 of dump system 9 shown installed. Note that base frame 10, which is about 47 inches wide in the illustrated implementation, fits between wheel wells 70a and 70b while also allowing the top sections of wing frames 20a and 20b to extend above wheel wells 70a and 70b. As shown, wheels 25a and 25b are located next to cab 75 end of cargo bed wall 72b. Note that hinges 13a and 13b are located close the right edge of tailgate 51. To hold base frame of dump system 9 secure on cargo bed 71 of truck 9, one end of tie down straps 29a and 29b are secured to ends of wing frames 20a while the opposite end of cargo straps are secured to cargo bed anchors 73a and 73b respectively. Also shown are ends of tie down straps 29c and 29d secured to wing frame 20b and the other ends secured to cargo bed anchors 73c and 73d respectively. To anchor base frame 10 securely on cargo bed 71, tie down straps 29a, 29b, 29c and 29d are equipped with ratchet adjusters 74a, 74b, 74c and 74d.

Figure 23:
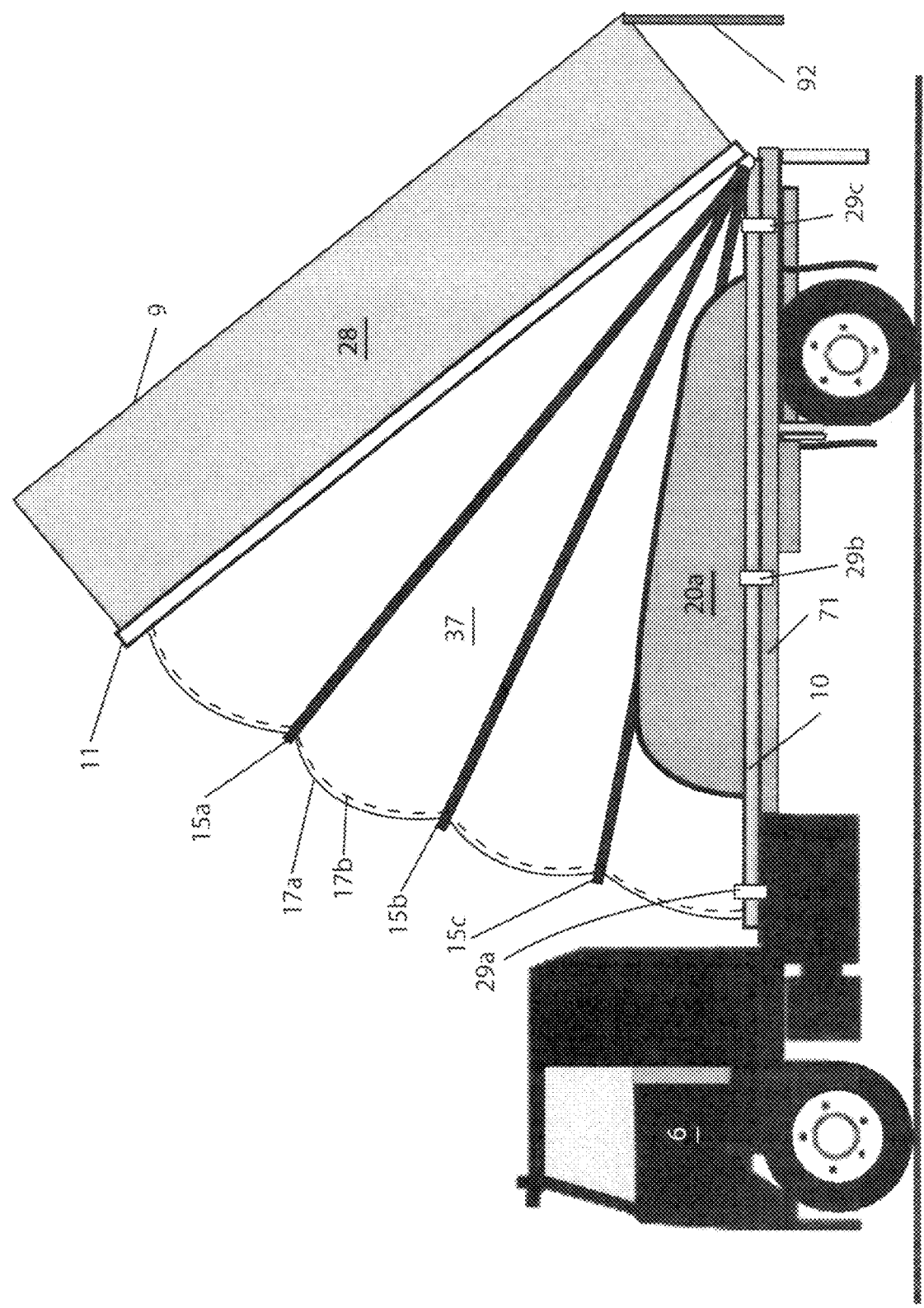
FIG. 23 is a side view of a dump system installed on a truck.

FIG. 23 is a side view of a truck 6 having a large cargo bed 71 designed for handling piece goods such as bagged material (on or off pallets), lumber, pipe, steel, cars, machinery, and the like. By placing dump system 9 on cargo bed 71, truck 6 can now haul bulk materials such as dirt, mulch, stone, grass clippings. etc. Base frame 10 of dump system 9 is secured to cargo bed 71 via tie downs 29a, 29b, 29c as well as others on the opposite side of the dump system (not shown). For this application, because base frame 10, dump frame 11 and container 28 are relatively long (e.g., 20' vs. 8'), inflate membrane 17a is equipped with multiple U-frames 15a, 15b, and 15c to prevent inflate membrane 37 from becoming oval and round in shape thereby reducing the height of inflate membrane 17a. Each U-frame 15a, 15b, 15c is configured and connected to the inflate membrane in a manner similar to the U-frames otherwise disclosed herein. Moreover, each U-frame 15a, 15b, 15c in the illustrated implementation is configured so that when the inflate membrane is fully inflated, for example, the angular distance between the rear ends (e.g., opposite the hinges) are equal between adjacent U-frames, between the uppermost U-frame 15a and the bottom portion of dump frame 11, and between the lowermost U-frame 15 and the base frame 10. Also, because of the long base frame 10, dump frame 11 and container 28, dump system 9 may require air pressures of several PSI (e.g., 2 or more) to dump heavy loads, inflate membrane 17a may be equipped with additional (e.g., two or more) plies of PVC coated fabric such as used in inflate membrane 17b. Notice wing frame 20a (another is on the opposite side, not shown) are used in conjunction with U-frames 15a, 15b and 15c to manage collection and storage of side wall folds (not shown) that form in the side walls of inflate membrane 17a and 17b.

Figure 24:
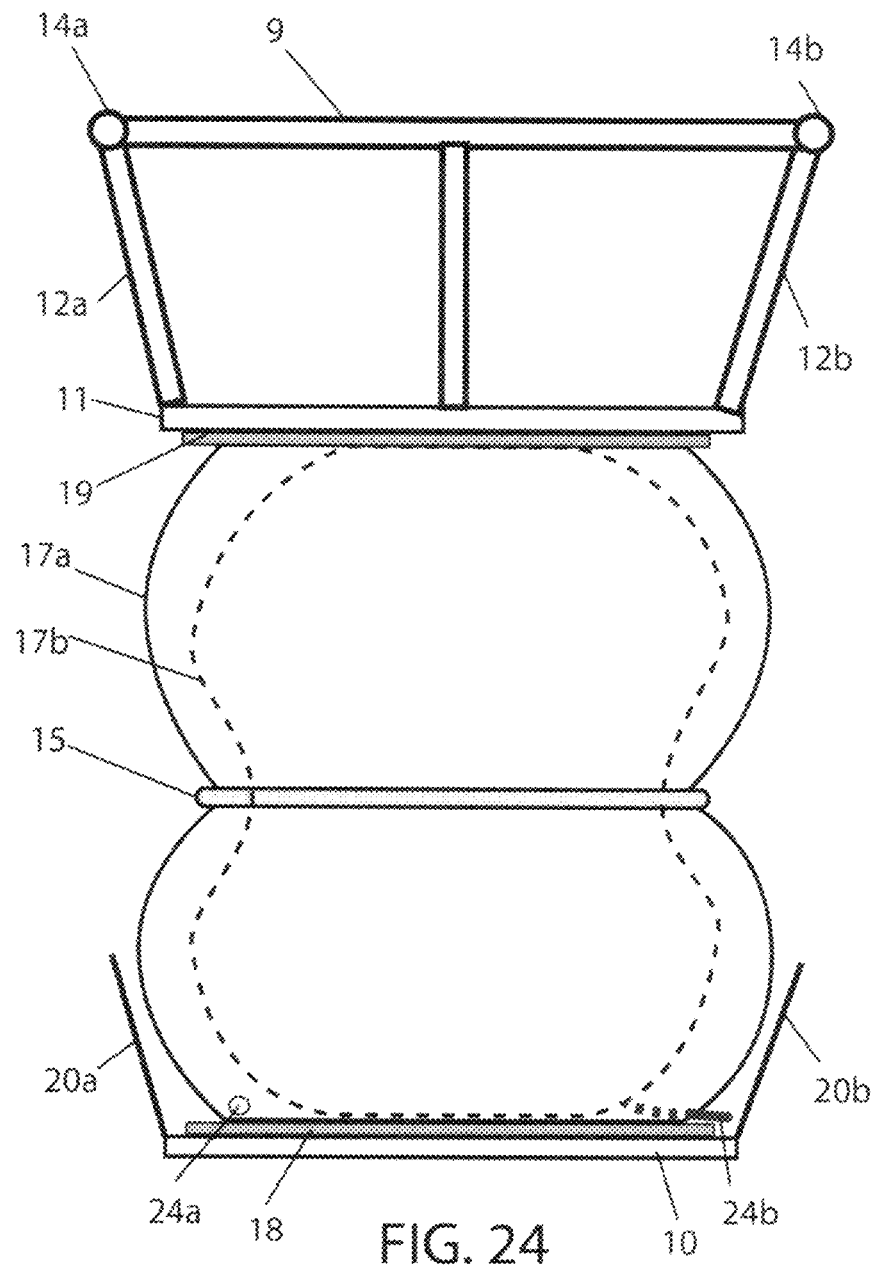
FIG. 24 is a cross-sectional end view of a dump system.

FIG. 24 is an end view of a dump system 9 equipped with a multiple-wall inflate membrane that includes inflate membrane 17b stowed inside partially inflated membrane 17a. In this configuration, inflate membrane 17b can be used if, for example, inflate membrane 17a has suffered damage and substantial leaks. Notice inflate membrane is inflated/deflated via inflation hose 24a while inflate membrane 17b is inflated/deflated via inflation hose 24b. One would switch between these inflation hoses—by connecting one or the other to the blower. Both typically include a built in check valve that prevents air flow out through the hose. Inflate membrane 17b can be a separate component entirely from inflate membrane 17a. Alternatively, inflate membrane 17b may be formed by securing walls of inflate membrane 17b to the upper and lower surfaces of inflate membrane 17a.

Figure 25:
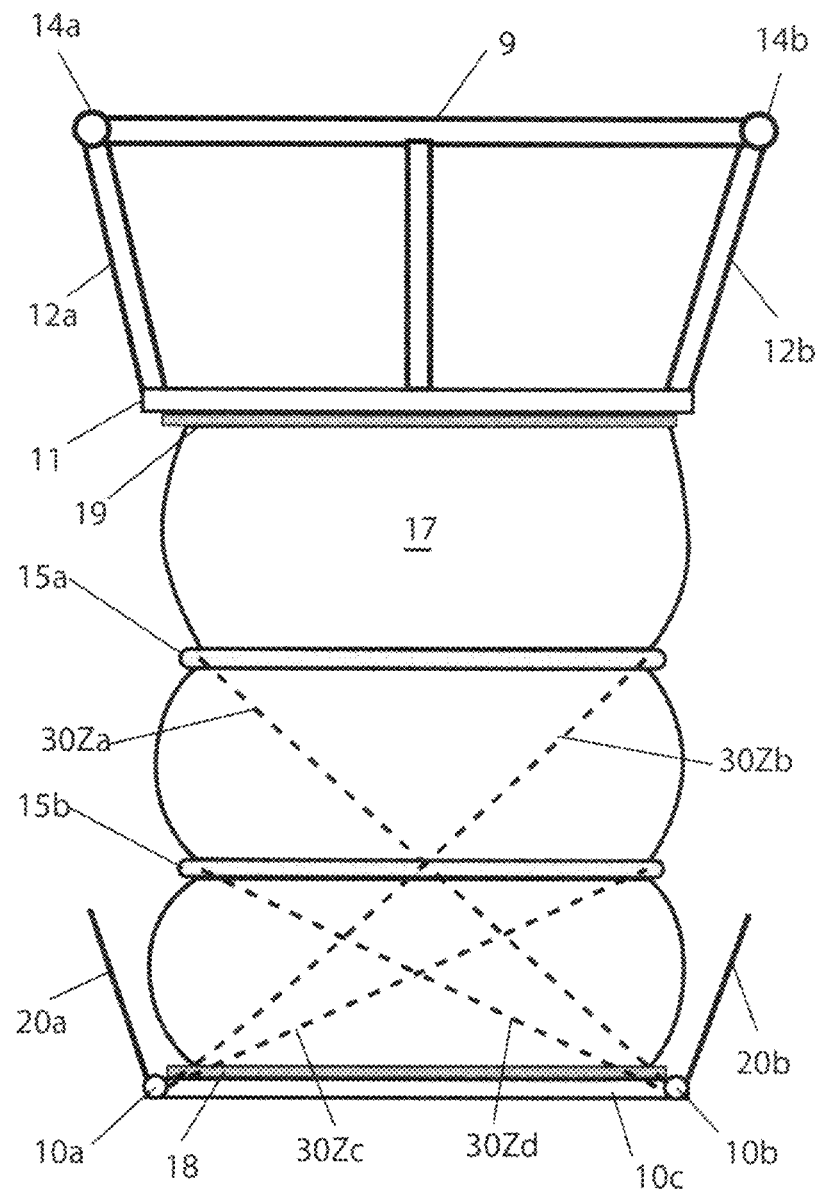
FIG. 25 is a cross-sectional end view of a dump system.

FIG. 25 is an end view of dump system 9 equipped with inflate membrane 17 and U-frames 15a and 15b. In this configuration, U-frames 15a and 15b are equipped with U-frame restraint cables 30Za, 30Zb, 30Zc and 30Zd respectively which are connected to base frame 10 inside inflate membrane 17. As shown, as inflate membrane 17 is inflated and as it expands upward, the upward movement of U-frames 15a and 15b are limited in their upward movement, as well as being used for lateral support to keep U-frames 15*a* and 15*b* centered, via U-frame restraint cables 30Za, 30Zb, 30Zc and 30Zd in an effort to further stabilize the dump process of dump frame 11 and container 28. In a typical implementation, the U-frame restraint cables may be attached to the U-frames and/or to the base frame 10 with cable anchors at either end thereof. The cables or anchors extend through small openings in the inflate membrane 17 to reach the U-frames and extend through small openings at the opposite ends to reach the base frame.

FIGS. 26, 27 and 28 are various views of an implementation of inflate membrane components including inflate membrane sidewall panels 37*a* and 37*b*, inflate membrane rear sidewall 37*x*, as well as inflate membrane bottom panel 18 and inflate membrane top panel 19. The inflate membrane sidewall panels 37*a* and 37*b* in the illustrated implementation are integrally formed with the rear sidewall 37 so that one single piece of material 37 will form the entire sidewall of the inflate membrane. Each of the bottom panel 18 and top panel 19 in the illustrated implementation is a single piece of material too, separate from the sidewall piece of material 37.

In the illustrated implementation, the sidewall piece of material has a section 37X that corresponds to the rear sidewall of the inflate membrane. The sidewall piece of material has other sections 37*a*, 37*b* that correspond to the side surfaces of the inflate membrane. The rear sidewall section 37X is trapezoidal, with edges that define a top and a bottom that are parallel to one another and oppositely sides that are angled as shown. Sidewall panel 37*a* is attached to one of the angled sides of the rear sidewall panel 37X and sidewall panel 37*b* is attached to the other one of the angled sides of the rear sidewall panel 37X. In some implementations, the sidewall panels 37*a*, 37*b* are integrally formed with the rear sidewall panel 37X. In some implementations, the sidewall panels 37*a*, 37*b* are separately formed from, and later attached to, the rear sidewall panel 37X.

Sidewall panel 37*a*, for example, has an edge that defines a flat bottom that aligns with and extends outward from the flat bottom of rear sidewall panel 37X, a 90 degree upward bend at the end of the flat bottom to define an outer edge, a 90 degree bend back toward the trapezoidal rear sidewall section 37X to define a top edge of inflate membrane front wall seam 100*a*, and an upwardly angled bend at the inner end of the top edge of the inflate membrane front wall seam 100*a* into an upwardly angled section that extends between the inner end of the top edge of the inflate membrane front wall seam 100*a* and the top end of the angled sidewall of the trapezoidal rear sidewall section 37X. Sidewall panel 37*b* is a mirror image of sidewall panel 37*a*.

In FIG. 26, notice U-frame restraint cable openings 30Ya, 30Yb, 30Yc, and 30Yd on inflate membrane sidewall 37*a*, and U-frame restraint cable openings 30Ye, 30Yf, 30Yg, and 30Yh.

In side panel 37*a*, for example, U-frame restraint cable opening 30Ya is the closest of all the U-frame restraint cable openings to the rear sidewall section 37X. Moreover, the U-frame restraint cable opening 30Ya is at a height above the bottom edge of the sidewall panel 37*a* that is between about 35% and 65% (or 40% to 60%) of the distance of the angled side edge of the rear sidewall section 37X. The other U-frame restraint cable openings 30Yb, 30Yc, and 30Yd are aligned with U-frame restraint cable opening 37Ya and with one another along an imaginary line that extends downward and outward from the position of U-frame restraint cable opening 37*a*. In side panel 37*b*, U-frame restraint cable openings 30Ye, 30Yf, 30Yg, and 30Yh are arranged as a mirror image of the U-frame restraint cable openings 30Ya, 30Yb, 30Yc, and 30Yd on inflate membrane sidewall 37*b*.

Also shown are zipper 62, max dump cable opening 59Z, pressure relief cable opening 60Z and inflation hose coupling hole 24Z on inflate membrane rear sidewall 37X. Pressure relief cable opening 60A and inflation hose coupling hole 24Z are side-by-side (and at the same height above the bottom edge of the rear sidewall panel 37 as one another). The inflation hose coupling hole 24Z is at a lower position than pressure relief cable opening 60Z and inflation hose coupling hole 24Z. In a typical implementation, during assembly of an inflate membrane, prior to attaching inflate membrane sidewall 37 to inflate membrane bottom panel 18 and inflate membrane top panel 19, inflate membrane front wall seams 100*a* and 100*b* may be joined together.

The bottom panel 18 of the inflate membrane in FIG. 27 has an outer edge that defines a flat rear portion, two flat side portions that are parallel to each other and perpendicular to the flat rear portion, and a front portion that is flat except for two notches (for accommodating hinges 13*a*, 13*b*). The top panel 19 of the inflate membrane in FIG. 28 has the same basic shape as the bottom panel 18 in FIG. 27. FIG. 27 identifies, according to one implementation, where on the bottom panel 18 the sidewall perimeter joint 35*c* (i.e., the joint between the bottom panel 18 and the sidewall panel 37) will be located when the inflate membrane is assembled. Likewise, FIG. 28 identifies, according to one implementation, where on the top panel 19 the sidewall perimeter joint 35*d* (i.e., the joint between the top panel 19 and the sidewall panel 37) will be located when the inflate membrane is assembled. The surfaces of the bottom panel 18 and top panel 19 within the sidewall perimeter joints 35*c* and 35*d* in FIGS. 27 and 28 are the surfaces that will be exposed to air pressure within the inflate membrane, after the inflate membrane has been assembled and when a dump system (e.g., 9) is operating using the assembled inflate membrane. Thus, it can be seen that, during operation, air pressure from within the inflate membrane will be applied across a large percentage of the bottom panel 18 and the top panel 19 (as determined by the percentage of surface area of bottom panel 18 and top panel 19 encompassed within the sidewall perimeter joint lines in FIGS. 27 and 28. For example, in various implementations, the percentage of the upper surface area of the top panel 18, for example, that falls within the line 35*c* that defines the sidewall perimeter joint is more than 60%, more than 70%, more than 80% or more than 90% or more than 95%. In a typical implementation, the same thing can be said of the top panel 19. This sort of arrangement contributes greatly to the amount of lifting force available in the dump system 9, even with very low air pressure in the inflate membrane. Moreover, it can be seen from FIGS. 27 and 28 that the top and bottom of the interior space of the inflate membrane, when assembled, is at least substantially rectangular (e.g., the outline 35*c* and the outline 35*d* follow a path that is rectangular with rounded corners and a slightly smaller width at a front end thereof than the back end thereof). In some implementations, the top and/or bottom of the interior space of the inflate membrane, when assembled, will be completely rectangular.

In FIG. 27, inflate membrane sidewall perimeter joint 35*c* of inflate membrane bottom panel is matched and secured with inflate membrane sidewall perimeter joint 35*a*. In FIG. 28, inflate membrane sidewall perimeter joint 35*b* of inflate membrane sidewall 37 is matched and secured to inflate membrane sidewall perimeter joint 37*d* of inflate membrane top panel 19. Also shown are cable anchors 63*a* and 63*b* for securing ends of pressure relief cable 60 and max dump cable 59. Also shown are seams 100a and 100b of inflate membrane sidewall 37 matching location of seams 100a and 100b on inflate membrane bottom panel 18 in FIG. 27 as well as inflate membrane front wall seams 100a and 100b matching location of seams 100a and 100b on inflate membrane top panel 19 in FIG. 28.

Figure 29:
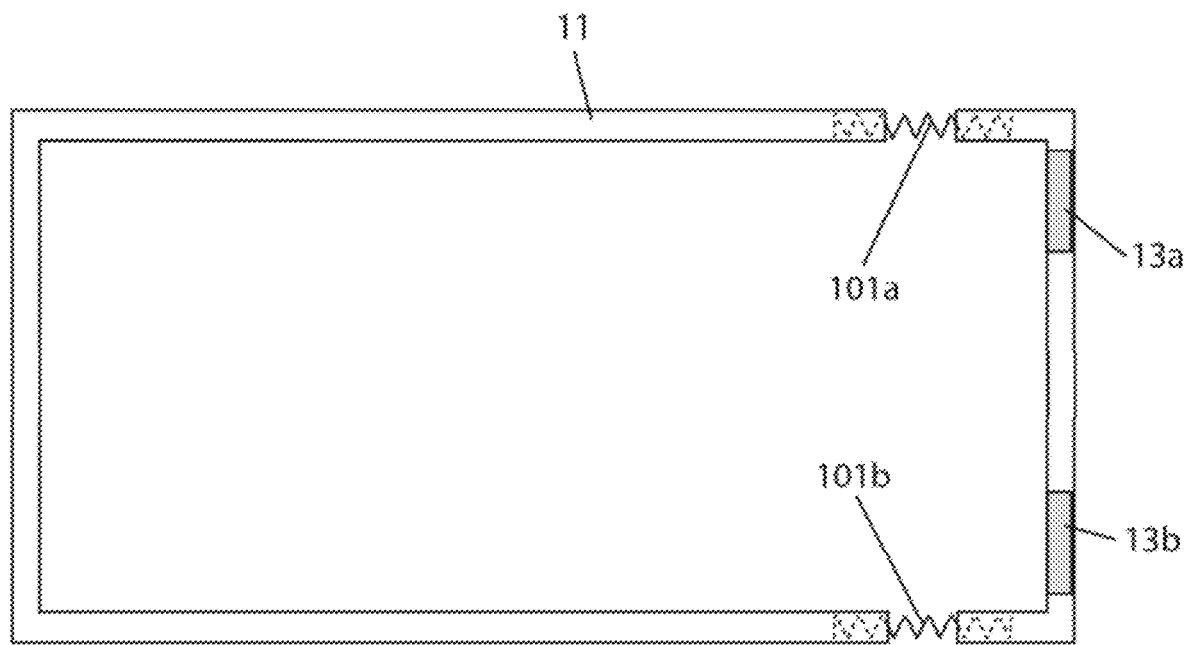
FIG. 29 is a partial, top view of an exemplary dump frame with springs.

FIG. 29 is a top view of alternative implementation of a bottom portion of dump frame 11 equipped with frame springs 101a and 101b near end of frame 11 where hinges 13a and 13b are located. In a typical implementation, springs 101a and 101b allow dump frame 11 to flex and twist if necessary or desired.

Figure 30:
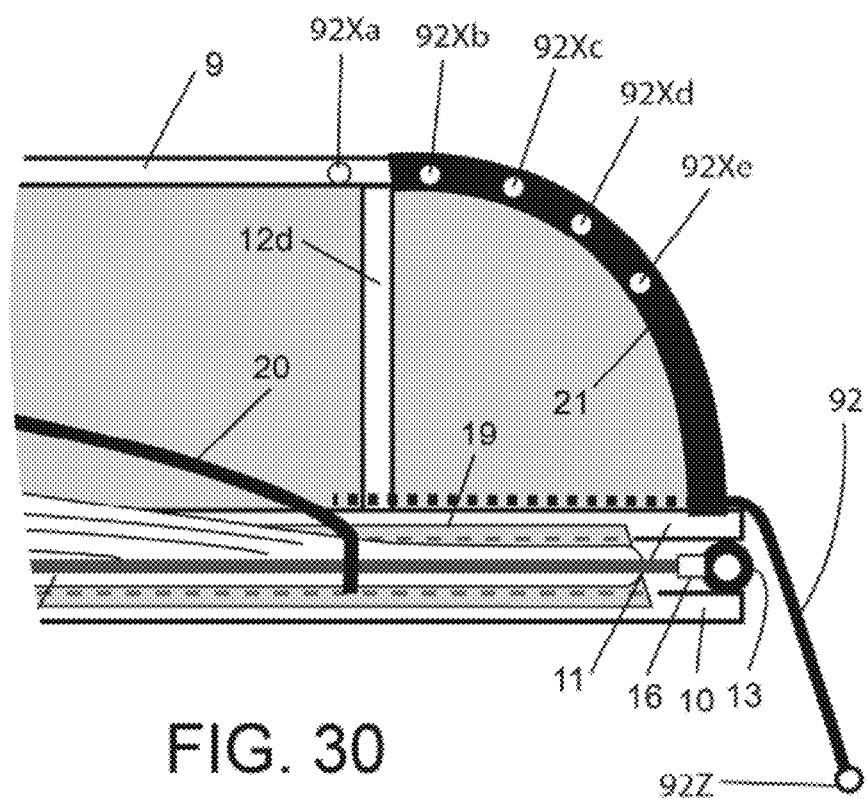
FIG. 30 is a detail view of an exemplary dump gate rail area.

FIG. 30 is a partial side view of dump system 9 showing dump gate rail 21 equipped with dump gate attachment holes 92Xa, 92Xb, 92Xc, 92Xd and 92Xe for providing attachment of dump gate 92, which may be made of rigid material such as metal or flexible material such as 40 oz. PVC coated woven polyester fabric. Locking pins 86b and 86c (not shown) can be used to secure dump gate flanges 92Z and 92Zb (not shown) to dump gate attachment holes 92Xa, 92Xb, 92Xc, 92Xd and/or 92Xe for closure of dump gate 92 to dump system 9.

Figure 31:
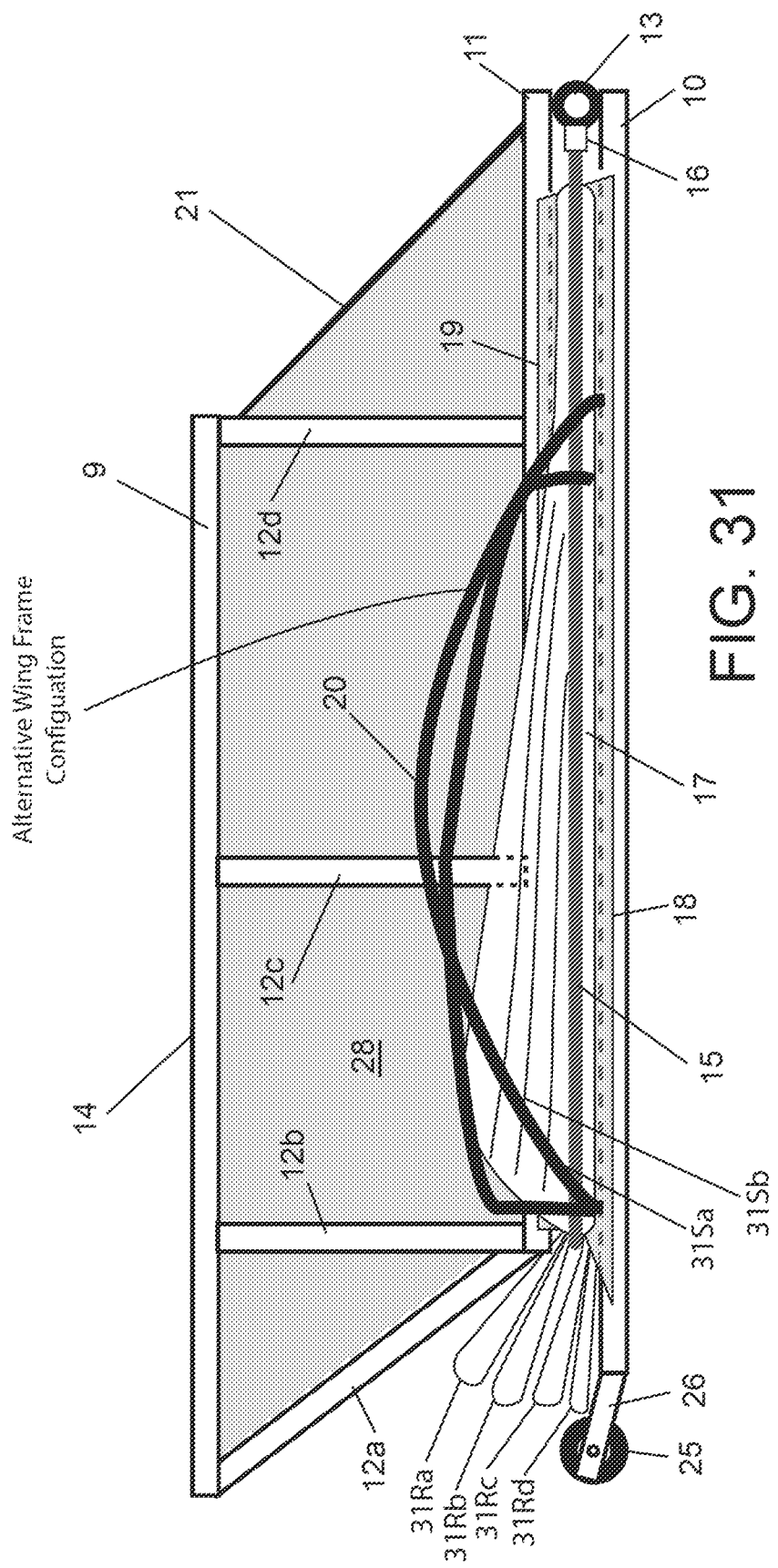
FIG. 31 is a side view of a dump system showing alternative possible wing frame configurations.

The wing frame 20 (and other components of the dump frame 9) can vary in configuration. FIG. 31, for example, shows a view of an exemplary dump system 9 with an alternative wing frame 20 configuration. In the illustrated implementation, the wing frame 9 forms a symmetrical (e.g., with a constant radius) from its forwardmost point to its rearmost point (e.g., where it connects to the base frame). In the illustrated implementation, the wing frame has a width of 62 inches (which can vary, e.g., +/−20% or more) and a height of 12 inches at its midpoint or high point (which can vary, too, e.g., +/−20% or more). The alternative wing frame configuration is shown (and labeled) in FIG. 31 superimposed on the wing frame configuration previously described. In reality, only one or the other of the wing frame configurations shown in FIG. 31 would be present (not both).

A number of embodiments of the invention have been described. Nevertheless, it will be understood that various modifications may be made without departing from the spirit and scope of the invention.

For example, the dump system can be utilized to store, transport (in the back of a vehicle, for example), and dump at a destination virtually any kind of material including, for example, landscaping materials such as grass clippings, mulch, dirt, gravel, leaves, tree branches, dry granulated materials and powders, and other debris. The dump system and any one or more of its various components can vary in size, shape, and configuration. Moreover, a variety of different types of materials may be used to manufacture the dump system and its various components.

The storage rack may be used with implementations of the dump system disclosed herein or with virtually any other dump systems including those that utilize hydraulic pressure, instead of air pressure, to raise and lower their material storage containers. The storage rack and any one or more of its various components can vary in size, shape, and configuration.

Unless otherwise indicated, relative terminology used herein (e.g., "upper", "lower", "above", "below", "front", "rear", etc.) is solely intended to describe particular implementations shown in the drawings or otherwise disclosed herein and is not intended to limit the scope of the disclosure to require particular positions and/or orientations. Moreover, certain relative terminology (e.g., "horizontal," "vertical," and the like) assume a normal upright orientation. If a normal upright orientation is not applicable, then the surfaces, components, subcomponents, etc. described as being "horizontal," "vertical," or the like, may not be. These terms, therefore, should be considered as merely describing particular illustrated implementations and, unless otherwise indicated or claims, not otherwise limiting to the scope of the present application. Unless otherwise indicated, none of the relative terminology used herein should be construed to limit the scope of the present application. Additionally, terms such as substantially, and similar words, may be used herein.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations and/or processes are disclosed herein as occurring in a particular order, this should not be understood as requiring that such operations be performed in the particular order shown or in sequential order, or that all indicated operations be performed in order to achieve desirable results. In certain circumstances, multitasking or parallel processing may be advantageous.

Other implementations are within the scope of the claims.

I claim:

1. A dump system comprising:
   a base;
   a container configured to pivot relative to the base;
   an inflate membrane coupled to the base and to the container; and
   a first U-frame that extends around the inflate membrane and is configured to pivot relative to the base,
   wherein the first U-frame is configured to restrain outward expansion of the inflate membrane as the inflate membrane expands pushing on the container and causing the container to pivot upward; and
   wherein the inflate membrane extends beyond a bottom side of a floor of the container.

2. The dump system of claim 1, wherein the first U-frame is configured to pivot upward as the inflate membrane expands.

3. The dump system of claim 2, further comprising:
   one or more U-frame interior supports connected to the first U-frame and extending into the inflate membrane through an opening in the inflate membrane.

4. The dump system of claim 3, wherein the one of more U-frame interior supports are configured to prevent the first U-frame from bending outward under the force of the inflate membrane inflating and expanding and to maintain the position of the first U-frame relative to the inflate membrane as the inflate membrane expands and collapses.

5. The dump system of claim 4, wherein the one or more U-frame interior supports comprises a plurality of interior supports, wherein each of the U-frame interior supports extends from a first connection point on a first side of the U-frame to a second connection point on a second side of the U-frame passing through an interior of the inflate membrane between the first connection point and the second connection point.

6. The dump system of claim 5, wherein each of the U-frame interior supports is made of steel cable and is connected at the first and second connection points to threaded eye hook fasteners and lock nuts that attach to first and second sides of the U-frame.

7. The dump system of claim 3, wherein each of the one or more U-frame interior supports extends from a first connection point on the U-frame to a second connection point on the base passing through an interior of the inflate membrane between the first connection point and the second connection point.

8. The dump system of claim 1, further comprising:
a second U-frame that extends around the inflate membrane and is configured to pivot relative to the base,
wherein the second U-frame is configured so as to be angularly displaced from the first U-frame when the inflate membrane is in a fully inflated state.

9. The dump system of claim 1, further comprising:
a first wing frame panel adjacent to a first side surface of the inflate membrane,
wherein the first wing frame panel is configured to collect and contain folds that form from material of the inflate membrane as the inflate membrane deflates and collapses.

10. The dump system of claim 9, further comprising:
a second wing frame panel adjacent to a second side surface of the inflate membrane,
wherein the second side surface of the inflate membrane is opposite the first side surface of the inflate membrane.

11. The dump system of claim 1, wherein a top and/or bottom of an interior space within the inflate membrane is at least substantially rectangular.

12. The dump system of claim 11, wherein a surface area of the inflate membrane is at least 185 square feet.

13. The dump system of claim 1, further comprising a blower coupled to the base, wherein the blower is configured to deliver air into the inflate membrane to cause the inflate membrane to fill and expand.

14. The dump system of claim 13, further comprising a dump frame configured to support the container.

15. The dump system of claim 14, further comprising:
a shut off switch for the blower; and
a max dump cable connected to the dump frame and to the blower shut off switch and passing through an inside of the inflate membrane,
wherein the max dump cable is configured such that the max dump cable becomes increasingly taut as the inflate membrane inflates and the angle of the dump frame and container increases until the max dump cable pulls the blower shut off switch, causing the blower to shut off.

16. The dump system of claim 15, further comprising:
a pressure relief valve on a rear surface of the inflate membrane, wherein the pressure relief valve is operable to control air flow through a pressure relief opening in the inflate membrane; and
a pressure relief cable connected to the dump frame and to the pressure relief valve and passing through an inside of the inflate membrane,
wherein the pressure relief valve is configured to be normally closed but to open in respond to being pulled by the pressure relief cable, and wherein the pressure relief cable is configured such that the pressure relief cable becomes increasingly taut as the inflate membrane inflates and the angle of the dump frame and container increases until the pressure relief cable pulls on the pressure relief valve, causing the pressure relief valve to open, thereby releasing air from the inflate membrane.

17. The dump system of claim 16, further comprising a high pressure switch configured to shut off the blower in response to a pressure in the inflate membrane exceeding a predetermined value.

18. The dump system of claim 1, further comprising:
a hand-operated exhaust valve configured to control flow through an exhaust opening in inflate membrane.

19. The dump system of claim 1, further comprising a zipper opening in the inflate membrane, wherein the zipper opening comprises an opening in a wall of the inflate membrane and a zipper configured to effectively close or open the opening.

20. The dump system of claim 1, wherein the inflate membrane is configured such that, when the inflate membrane is being inflated, a certain portion of the sidewalls of the inflate membrane rise above bottom side edges of the container to cradle the container and thereby provide lateral support to the container as the container pivots upward.

21. The dump system of claim 1, further comprising an extension wall coupled to an upper edge of the container.

22. The dump system of claim 1, further comprising a back-up inflate membrane inside the inflate membrane.

23. The dump system of claim 1, further comprising:
a dump frame to support the container, wherein the dump frame comprises a plurality of rigid structures and one or more springs connecting two or more of the rigid structures, wherein the one or more springs provide flexibility and twistability in the dump frame.

24. The dump system of claim 1 configured as an insert configured to be placed on a vehicle's flatbed or trailer.

25. The dump system of claim 1, further comprising:
a blower to inflate the inflate membrane, wherein the blower is configured to produce air flow into the inflate membrane of at least 75 cubic feet per minute with a pressure of less than ½ pound per square inch.

26. The dump system of claim 1, further comprising a rear discharge at a rear of the container.

27. The dump system of claim 1, further comprising a side discharge at a side of the container.

28. A dump system comprising:
a base;
a container configured to pivot relative to the base;
an inflate membrane coupled to the base and to the container; and
a first wing frame panel adjacent to a first side surface of the inflate membrane,
wherein the first wing frame panel is configured to collect and contain folds that form from material of the inflate membrane as the inflate membrane deflates and collapses.

29. The dump system of claim 28, further comprising:
a second wing frame panel adjacent to a second side surface of the inflate membrane,
wherein the second side surface of the inflate membrane is opposite the first side surface of the inflate membrane.

30. The dump system of claim 28, further comprising:
a first U-frame that extends around the inflate membrane and is configured to pivot upward relative to the base as the inflate membrane expands and to pivot downward relative the base as the inflate membrane collapses, wherein the first U-frame is further configured to restrain outward expansion of the inflate membrane as the inflate membrane expands pushing on the container and causing the container to pivot upward.

31. The dump system of claim 30, further comprising:
one or more U-frame interior supports connected to the first U-frame and extending into the inflate membrane through an opening in the inflate membrane,
wherein the one of more U-frame interior supports are configured to prevent the first U-frame from bending outward under the force of the inflate membrane inflating and expanding and to maintain the position of the first U-frame relative to the inflate membrane as the inflate membrane expands and collapses.

32. The dump system of claim 31, wherein each of the U-frame interior supports extends from a first connection point on a first side of the U-frame to a second connection point on a second side of the U-frame passing through an interior of the inflate membrane between the first connection point and the second connection point.

33. The dump system of claim 31, wherein each of the U-frame interior supports extends from a first connection point on the U-frame to a second connection point on the base passing through an interior of the inflate membrane between the first connection point and the second connection point.

34. The dump system of claim 28, further comprising:
a second U-frame that extends around the inflate membrane and is configured to pivot relative to the base,
wherein the second U-frame is configured so as to be angularly displaced from the first U-frame when the inflate membrane is in a fully inflated state.

* * * * *